United States Patent
Kimura et al.

(12) 
(10) Patent No.: US 6,173,422 B1
(45) Date of Patent: *Jan. 9, 2001

(54) ERROR MONITORING SYSTEM FOR VIDEO/AUDIO DEVICES

(75) Inventors: Hisao Kimura; Takehiko Tanaka; Toshiaki Yamamoto, all of Kanagawa (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/723,356

(22) Filed: Sep. 30, 1996

(30) Foreign Application Priority Data

Oct. 5, 1995 (JP) .................................. 7-284652

(51) Int. Cl.[7] ....................................... G06F 11/32
(52) U.S. Cl. ................... 714/57; 714/44; 714/47; 710/15; 348/180
(58) Field of Search ............ 395/185.01, 183.19, 395/184.01, 183.15, 185.02, 185.09, 200.54, 835; 340/825.06; 348/180, 181, 184; 714/44, 57

(56) References Cited

U.S. PATENT DOCUMENTS

| | | | |
|---|---|---|---|
| 4,810,958 | 3/1989 | Mogi et al. | 324/73 |
| 4,907,181 * | 3/1990 | Hedtke et al. | 364/579 |
| 5,237,677 | 8/1993 | Hirosawa et al. | 395/575 |
| 5,305,437 | 4/1994 | Fritze et al. | |
| 5,367,382 * | 11/1994 | Bhatt et al. | 358/403 |
| 5,432,715 * | 7/1995 | Shigematsu et al. | 395/184.01 |
| 5,446,879 | 8/1995 | Yamamoto et al. | 395/180 |
| 5,471,399 | 11/1995 | Tanaka et al. | |
| 5,481,707 * | 1/1996 | Murphy, Jr. et al. | 395/650 |
| 5,500,944 * | 3/1996 | Yoshida | 395/184.01 |
| 5,504,863 * | 4/1996 | Yoshida | 395/184.01 |
| 5,533,193 * | 7/1996 | Roscoe | 395/185.01 |
| 5,542,047 * | 7/1996 | Armstrong | 395/200.11 |
| 5,548,725 * | 8/1996 | Tanaka et al. | 395/200.05 |
| 5,555,191 * | 9/1996 | Hripcsak | 364/514 |
| 5,586,251 * | 12/1996 | Coleman et al. | 395/183.19 |
| 5,613,065 * | 3/1997 | Ishibashi et al. | 395/185.01 |

FOREIGN PATENT DOCUMENTS

| | | | |
|---|---|---|---|
| 655 338 | 5/1993 | (AU) | |
| 0 488 178 A2 | 6/1992 | (EP) | |
| 05 066 959 | 3/1993 | (JP) | G06F/11/22 |

OTHER PUBLICATIONS

B. Elkind et al.: "Proposal for Error Detection and Handling in Digital Studio Equipment", SMPTE Journal, vol. 100, No. 12, Dec. 1991, USA, pp. 940–945, XP000243940.

* cited by examiner

*Primary Examiner*—Dieu-Minh T. Le
*Assistant Examiner*—Scott T. Baderman
(74) *Attorney, Agent, or Firm*—Frommer Lawrence & Haug, LLP; William S. Frommer; Gordon Kessler

(57) ABSTRACT

The system is comprised of processing unit for executing an error monitoring process by detecting errors occurring in the video/audio devices, communication unit connecting the video/audio devices to the processing unit, and display unit connected to the processing unit to simultaneously display on a common display plane a plurality of images indicating the video/audio devices and to give an error indication in accordance with a result of the error monitoring process by the processing unit, the processing unit automatically executing the error monitoring process against respective the video/audio devices, and controlling the display unit to give the error indication by emphasizing one of the images corresponding to one of the video/audio devices from which an error is detected by the processing unit.

49 Claims, 17 Drawing Sheets

ERROR MONITORING SYSTEM FOR VIDEO/AUDIO DEVICES

BACKGROUND OF THE INVENTION

1. Field of the Invention

This invention relates to a video/audio device error monitoring system used to integrally monitor and control errors of video/audio devices in a broadcasting station or a video/audio media production studio where a number of such video/audio devices are connected for recording, reproducing, storing and compiling video/audio data.

2. Related Art

In a typical broadcasting station or in a production studio for preparing a program or other video/audio media, a number of (several or decades of) video/audio devices are used for recording, reproducing, storing and compiling video/audio information.

Video/audio information is recorded on recording media by each of individual video/audio recording devices, and these recording media are cumulatively stored in a video/audio storage device. Video/audio information is reproduced from individual recording media by multiple video/audio reproducing devices, and are compiled by an video/audio compiler. Certain production studios, for example, are equipped with a number of such systems to progress works in parallel.

Also in typical broadcasting stations that need to progress multiple jobs in parallel, namely, delivery of a program, recording, accumulation and compilation of video/audio information to prepare another program, many sets of video/audio devices are installed.

Such a system connecting a number of devices involves a high probability of error in one or more of the devices. In a broadcasting station, in particular, when any error occurs in a device concerned with actual transmission of programs, a quick remedy to the error is required. To enable quick remedies to errors, it is effective to record information on past errors as histories of respective devices to previously know from the information whichever errors are liable to occur in individual devices.

Conventionally, however, even in a system connecting a number of video/audio devices, no means was prepared to integrally grasp the status of actual use and operation of these devices connected to the system. For example, in a system with video/audio devices located in separate rooms, it was only possible to manage the devices for each room but impossible to centralize data on all devices in different rooms.

For example, in a conventional error monitoring system shown in FIG. 18, a monitor personnel is in charge of devices in each room. When any error occurs in a device in his room, he personally must step to the site of the device to find out the nature of the error. In the illustrated example, when an error occurs in a device in a studio 181, the man in charge of the studio 181 goes to the editing room 182 to give a notice, the man in charge of the editing-room 182 transfers the notice to the man in charge of the master control room, thereby to gather error information on devices in different rooms in the broadcasting station.

It was therefore difficult to obtain precise knowledge on errors of individual devices and to keep prior estimation of natures of errors that are liable to occur in respective devices.

Another problem with the conventional error monitoring system is that management of error histories of video/audio devices is simply the way that each man in charge describes such errors on a error history note as shown in FIG. 18. It was therefore difficult to manage information on individual devices in a system of a broadcasting station. Beside this, it was also difficult to keep prior knowledge on errors that are liable to occur in respective devices.

When an error occurs in a device, it sometimes accompanies the job of opening an operation manual of the device to know the precise nature of the error, which will inevitably causes a delay in actual remedy to the error. This is particularly so when a rare error occurs.

Recently, more and more digital devices have been provided also in the field of video/audio devices. Another problem with the conventional error monitoring system is that it is difficult to visually monitor and control the status of operations of devices in case of digital devices as compared with video/audio devices in form of an analog circuit.

OBJECT AND SUMMARY OF THE INVENTION

It is therefore an object of the invention to provide a video/audio device error monitoring system including a number of video/audio devices, which can manage errors in all devices integrally and totally.

According to the invention, there is provided an error monitoring system for conducting error monitoring of a plurality of video/audio devices, comprising:

processing means for executing an error monitoring process by detecting errors occurring in the video/audio devices;

communication means connecting the video/audio devices to the processing means; and display means connected to the processing means to simultaneously display on a common display plane a plurality of images indicating the video/audio devices and to give an error indication in accordance with a result of the error monitoring process by the processing means;

the processing means automatically executing the error monitoring process against respective the video/audio devices, and controlling the display means to give the error indication by emphasizing one of the images corresponding to one of the video/audio devices from which an error is detected by the processing means.

According to another aspect of the invention, there provided an error monitoring system for conducting integral error monitoring of a plurality of video/audio devices that are grouped into certain units, comprising:

first information processing means that acquires error information for each of the units by detecting any error existing in the video/audio devices;

communication means connecting the video/audio devices to the first information processing means;

second information processing means connected to the first information processing means through a predetermined communication line to acquire the error information acquired by the first information processing means;

third information processing means connected to the second information processing means through the communication line to acquire the error information acquired by the second information processing means; and display means connected to and controlled by the third information processing means to display images indicating the video/audio devices connected to the first information processing means and to give an error indication by emphasizing the image of particular one of the video/audio devices when the third information processing means detects an error in the particular video/audio device.

According to another aspect of the invention, there is provided an error monitoring system for conducting integral error monitoring of a plurality of video/audio devices, comprising:

information processing means that acquires error information for each of the units by detecting any error existing in the video/audio devices, and acquires device identifying information identifying respective video/audio devices and monitor information of the video/audio devices;

communication means connecting the video/audio devices to the information processing means; and storage means connected to the information processing means to store the device identifying information and the device monitor information so as to permit the device monitor information to be obtained by means of the device identifying information;

the information processing means automatically storing the acquired device identifying information and device monitor information in the storage means, automatically managing the device monitor information based on the device identifying information, automatically searching into the storage means to find out the device identifying information on one of the video/audio devices based on new device monitor information when the new device monitor information is obtained, and adding the new device monitor information to the device monitor information searched out.

According to another aspect of the invention, there is provided an error monitoring system for conducting integral error monitoring of a plurality of video/audio devices that are grouped into certain units, comprising:

first information processing means that acquires error information for each of the units by detecting any error existing in the video/audio devices, and acquires device identifying information identifying respective video/audio devices and monitor information of the video/audio devices;

communication means connecting the video/audio devices to the first information processing means; and second information processing means connected to the first information processing means through a predetermined communication line to acquire the error information, the device identifying information and the device monitor information that are acquired by the first information processing means;

third information processing means connected to the second information processing means through the communication line to acquire the error information acquired by the second information processing means; and storage means connected to the second information processing means to store the device identifying information and the device monitor information so as to permit the device monitor information and the error information to be identified by the device identifying information;

the second information processing means automatically storing the acquired error information, device identifying information and device monitor information in the storage means, automatically managing the error information and device monitor information based on the device identifying information, automatically searching into the storage means to find out the device identifying information and/or error information linked to new device monitor information and/or new error information when the new device monitor information and/or error information is obtained, and adding the new device monitor information and/or error information to the device monitor information searched out.

According to another aspect of the invention, there is provided an error monitoring method for monitoring errors of a plurality of video/audio devices, comprising:

a first step in which information processing means connected to the video/audio devices judges whether any error exists in any one of the video/audio devices;

a second step in which, when any error is judged to exist in the first step, display means displaying images corresponding to respective video/audio devices emphasizes one of the images corresponding to one of the video/devices in which the error exists;

a third step in which the information processing means acquires error information indicating the error from the video/audio device containing the error;

a fourth step in which the information processing means controls the display means to display the error information acquired in the third step;

a fifth step in which the error information displayed by the display means in the fourth step is stored in storage means connected to the information processing means; and a six step in which when the information processing means judges that no error exists in any one of the video/audio devices connected thereto and if there is any one of the images of the video/audio devices that is still emphasized, then the information processing means returns the emphasized image into its original state, and then goes back to the first step.

According to another aspect of the invention, there is provided an error monitoring method for monitoring errors of a plurality of video/audio devices, comprising:

a first step in which information processing means connected to said video/audio devices issues to the video/audio devices connected thereto a device identifying information request signal to request device identifying information for identifying respective video/audio devices; the video/audio devices in receipt of the device identifying information request signal send back the device identifying information to the information processing means; and the information processing means acquires the device identifying information;

a second step for storing the device identifying information acquired in the first step in storage means connected to the information processing means;

a third step for judging whether any error exists in any one of the video/audio devices;

a fourth step in which, when any error is judged to exist in the first step, the information processing means acquires error information indicating the nature of the error from the video/audio device containing the error, and the error information is stored in the storage means to permit the error information to be obtained through the device identifying information;

a fifth step for issuing a monitor information request signal to request device monitor information containing information necessary for monitoring the video/audio devices from the information processing means to the video audio devices; sending back the device monitor information responsive to the monitor information request signal from the video/audio devices to the information processing means; the device monitoring information being acquired by the information processing means;

a sixth step for storing the device monitor information acquired in the fifth step in the storage means so as to permit the device monitor information to be obtained through the device identifying information; and a seventh step for automatically searching out the device identifying information stored in the storage means corresponding to new device monitor information and/or error information when the new device monitor information and/or error is obtained in the first step; and for adding the new device monitor information and/or error information to the device monitor information and/or error information searched out.

DESCRIPTION OF THE PREFERRED EMBODIMENTS

Figure 1:
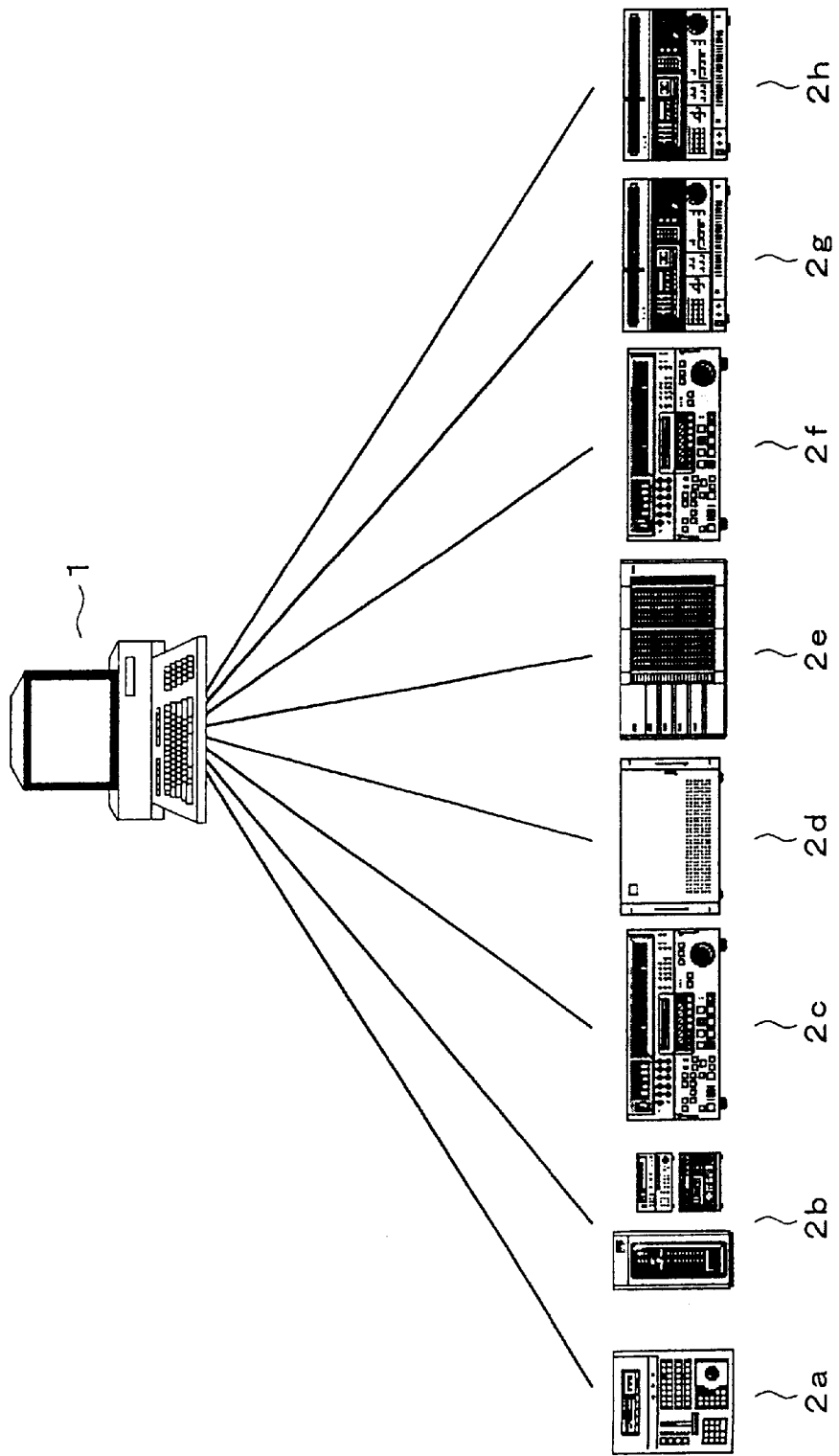
FIG. 1 is a diagram showing a construction of an error monitoring system according to the invention.
Figure 2:
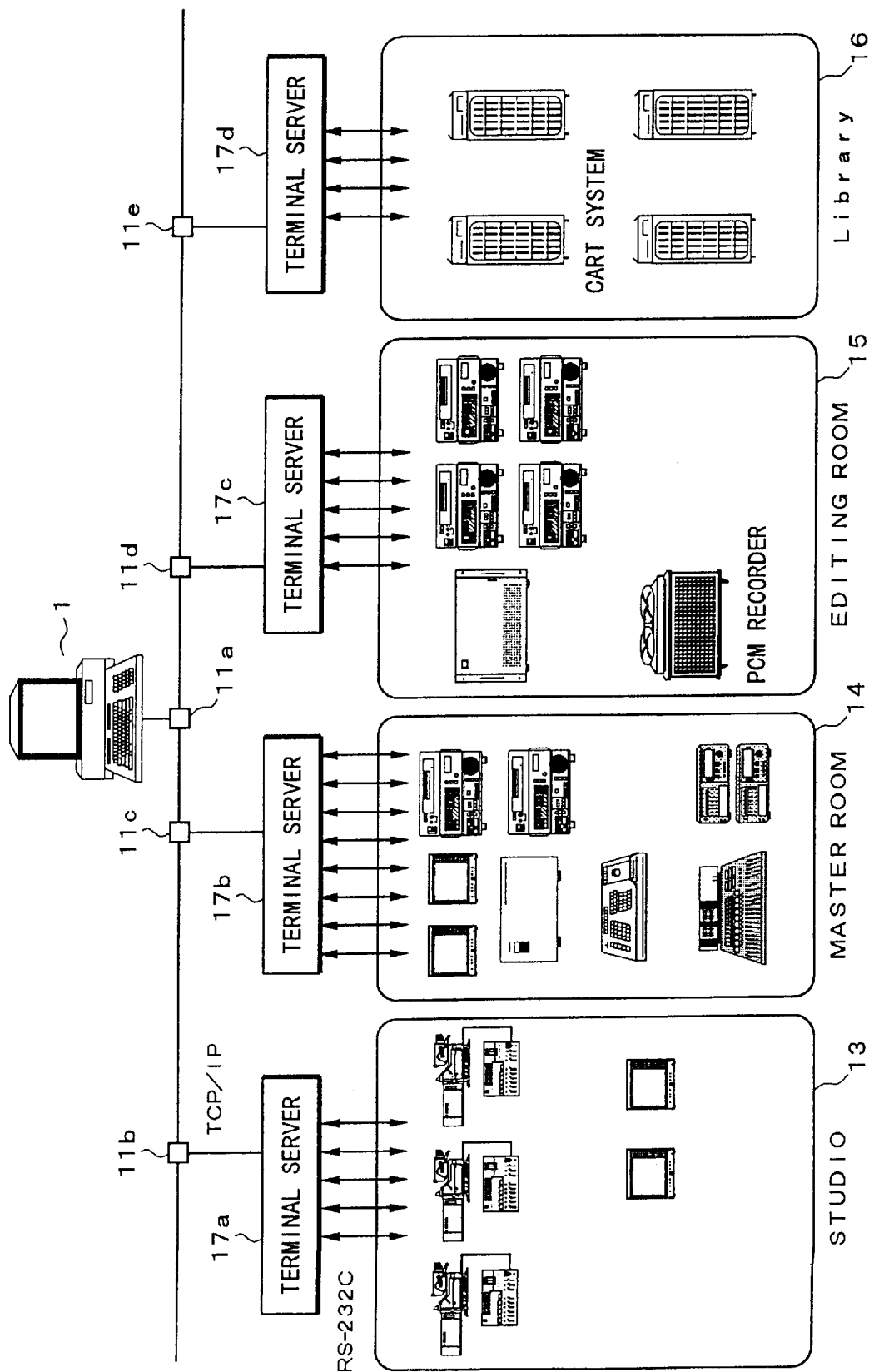
FIG. 2 is a diagram showing a construction of another error monitoring system according to the invention.

An embodiment of the invention is described below with reference to the drawings. FIG. 1 and FIG. 2 illustrate constructions of different error monitoring systems (ISR system: Interactive Status Reporting System) according to the invention. The systems are different in mode of connection of video/audio devices to the computer in charge of error monitoring operations. In the system of FIG. 1, video/audio devices are connected to the computer by RS-232C, and those in FIG. 2 are connected by LAN such as Ethernet.

In the example using RS-232C for connection, the maximum number of video/audio devices that can be connected in a single system is limited to eight due to restrictions imposed by the hardware. When the computer 1 has eight RS-232C ports, eight video/audio devices 2a through 2h can be connected individually to these eight ports.

The computer 1 always monitors the connected video/audio devices 2a through 2h to detect errors if any. More specifically, the computer 1 issues and circulates an error detection command to the devices 2a to 2h. If any error occurs in each device after the latest receipt of the command, it returns back an error code indicating the error to the computer 1.

The video/audio devices 2a to 2h have a self diagnostic function for its own errors. The computer 1 may be alternatively programmed to give specific commands to individual devices 2a to 2h to do self-diagnosis on specific items. Periodical error detection is done while running the devices for their ordinary jobs, but self diagnosis is done by interrupting the ordinary jobs and running them for their diagnostic operations. Therefore, self diagnosis can obtain more precise information than periodical error detection.

In the example of FIG. 2 using LAN, 64 video/audio devices, in total, can be connected to the computer 1. In this system, the computer 1 is connected to, for example, an Ethernet LAN line 12 having the protocol of TCP/IP, via the transceiver 11a. The error monitoring system is introduced to a studio 13 for collecting and recording video/audio data, master room 14 for controlling devices in different rooms, editing room 15 for compilation of recorded video/audio data, and library 16 for storing and stocking a number of video/audio data.

In each of these rooms 13 to 16, a plurality of video/audio devices are installed. Devices in the studio 13 are connected to a terminal server 17a via RS-232C, for example. The terminal server 17a is connected to the LAN line 12 through a transceiver 11b by Ethernet. That is, the terminal server 17a converts the communication protocol, RS-232C, of a respective device, into the Ethernet protocol TCP/IP, and vice versa.

Devices in the master room 14, editing room 15 are similarly connected to terminal servers 17b, 17c and 17d for conversion of their protocols from RS-232C to TCP/IP, and are connected to the LAN line 12 via transceivers 11c, 11d and 11e.

Also in the example using connection by a LAN line, the maximum number of video/audio devices that can be connected in a single system is limited to 64. The limitation derives from the communication program of Ethernet (TCP/IP) used in this example.

Also in this example, like in the former example using RS-232C for connection to the computer, detection of errors is periodically executed by the computer 1 to video/audio devices settled in different room 13 to 16. In this case, a command is sent from the computer 1 according to TCP/IP protocol, then converted into RS-232C by the terminal servers 17a to 17d of respective rooms, and then sent to individual video/audio devices. It is also possible to program the computer 1 to give specific commands to individual devices to do self-diagnosis on specific items.

Examples of connection shown in FIGS. 1 and 2 show only those for the error monitoring system to which the present invention is directed, and connection for video/audio signals are not shown for simplicity.

Figure 3:
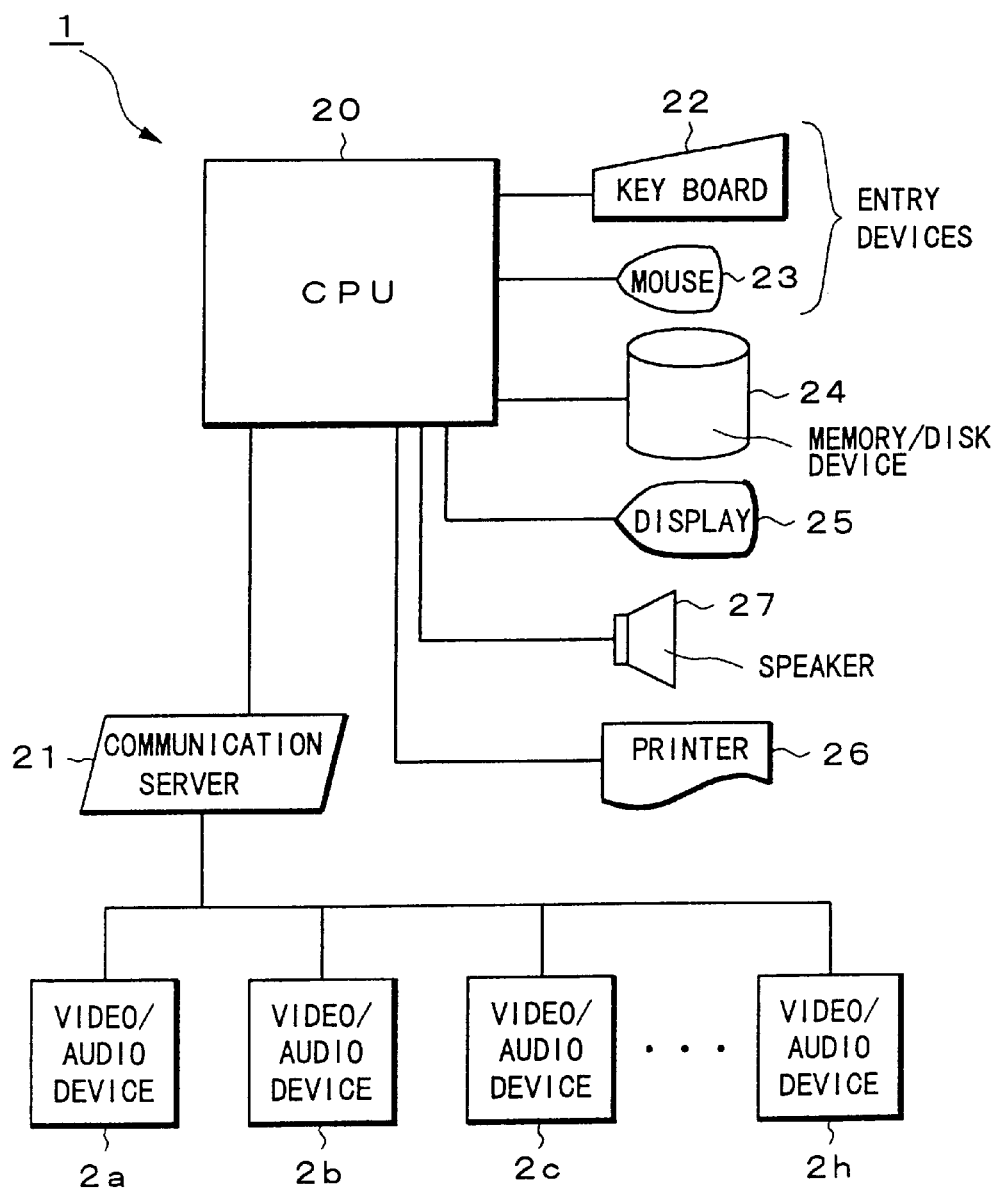
FIG. 3 is a block diagram of a computer 1 used as an error monitor in an embodiment of the invention.

FIG. 3 shows a construction of the computer 1 as the error monitoring unit in the same embodiment. Connected to a central processing unit 20 comprising CPU, memory, and so forth, is a communication server 21 using RS-232C, for example, to behave as an interface to the video/audio devices 2a, 2b, 2c, . . . and 2h.

If the communication server 21 complies with the TCP/IP protocol, maximum 64 video/audio devices can be connected to a LAN line (Ethernet) via some terminal servers as shown in FIG. 2.

Connected to the central processing unit 20 are entry devices including a mouse 23 and a keyboard 22 to permit an operator to enter various kinds of information or instructions to the computer 1. Entry of information or instructions may be done either by communication from an external computer connected by the LAN line, for example, or by reading data from an externally prepared recording medium such as floppy disc.

A memory/disc device 24 used as an external storage device may be a hard disc in which various data and a program for the central processing unit 20 are stored. Also stored in the memory/disc device 24 are various files concerning video/audio devices to be controlled by the error monitoring system, and a data base is established therein. Messages from the central processing unit 20 and information on the video/audio devices 2a to 2h connected through the communication server 21 can be displayed on a display 25 in form of CRT, for example. These messages and information can be printed out by a printer 26.

The computer 1 is also equipped with a speaker 27 as a sound source for generating sounds under control of the central processing unit 20.

Figure 4:
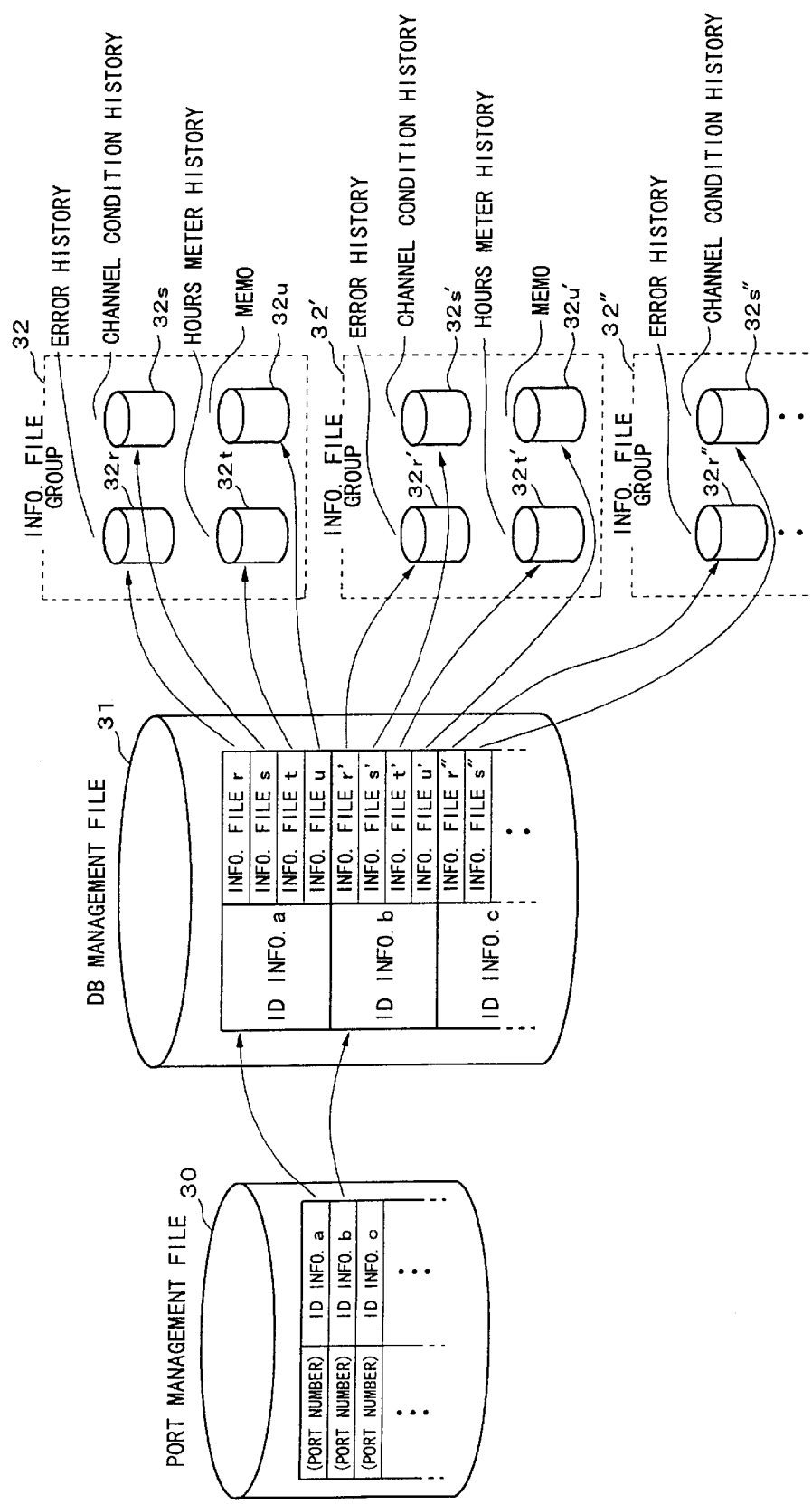
FIG. 4 is a diagram showing a construction of a data base file.

FIG. 4 shows an example of the architecture of files in the data base established in the memory/disc device 24. A port management file 30 stores information on ports of the communication server 21 connected to the respective video/audio devices, and device identifying information a, b, c, . . . of the video/audio devices together with port numbers of the communication server 21 as their indices.

Device identifying information pertains to information unique to respective devices, which is originally stored in their ROMs, for example. Typically, it includes the name of a maker of the video/audio device, model of the device, serial number and destination (place of destination such as Europe, America, etc.). The device identifying information is originally stored in each video/audio device, and it is read and acquired by the computer 1 after the device is connected to the computer 1.

In the case where the computer 1 and the video/audio devices 2a to 2h are connected by RS-232C as shown in FIG. 1, upon making the port management file 30, respective port numbers assigned to RS-232C ports of the communication server 21 are linked to respective device identifying information a, b, c . . . of the video/audio devices 2a through 2h connected to these ports.

In the case where the computer 1 and multiple video/audio devices are connected through terminal servers by Ethernet as shown in FIG. 2, upon making the port management file 30, terminal server IDs and port numbers of the communication server 21 assigned to RS-232C connected to respective devices are linked to device identifying information a, b, c, . . . of these video/audio devices.

In the data base management file 31, titles of information files of respective devices and directories for storing the files are written with the device identifying information a, b, c, . . . of the devices as their indices. As to the device identifying information a, for example, titles of information files r, s, t, u and directories for storing them are written. Similarly, title of information files r', s', t', u' and their directories are written for the information identifying information b.

Information obtained from video/audio devices includes, for example, channel condition information a and hour meter information, in addition to error information resulting from error detection by the error monitor/management system. Channel condition information indicates error rates of digital video tape recorders. Hour meter information includes, for example, operation hours indicating sums of periods of time the respective devices have ever been activated after production, head hours indicating sums of periods of time their rotating drums attached with heads have ever been rotated, and threading hours indicating total occurrences of insertion and removal of tapes.

Information of the devices is added to the error history file 32r accumulating error information, channel condition history file 32s accumulating channel condition information, hour meter history file 32t accumulating g hour meter information, a and memo file 32u, respectively, and it is stored in a directory named information file group 32. Titles of history files 324, 32s, 32t, 32u and the name of directory indicating the information file group 32 are determined by information files r, s, t, u.

Different information file groups 32, 32', 32", . . . are prepared for respective device identifying information a, b, c, . . . in the data base management file 31.

Memo files 32u, 32'u, 32"u, . . . permit free entry of memos by a user to describe any desired information on the devices, such as dates of their maintenance.

The port management file 30, data base management file 31, and information file groups 32, 32', 32", . . . are linked with each other by pointers. That is, for linking the port management file 30 with the data base management file 31, device identifying information a, b, c, . . . is used as pointers. For linking the data base management file 31 and information file groups 32, 32', 32", . . . , information files r to u, r' to u', r" to u", et seq. are used as pointers.

Therefore, a user can access to any desired one of information files r to u, r' to u", r" to u", . . . from a linked port number in the port management file 30 through a corresponding pointer and can obtain information on a particular video/audio device connected to the desired port number.

When a video/audio device connected to a port is replaced, which changes the relationship between the port and the device, the device identifying information is kept unchanged, and only the port number is rewritten. In this manner, regardless of a change in the relation between a connection port and a device, no change is needed in contents of the data base management file 31 and in information file groups 32, 32', 32", . . . .

The data base of the error/monitor/management system according to the invention is thus established in the memory/disc device 24 from the port management file 30, data base management file 31, and information file groups 32, 32', 32", . . . .

Next explained are error monitoring operations against video/audio devices. The explanation is begun with the example of FIG. 1 where eight video/audio devices 2a to 2h to the computer 1 by RS-232C.

Figure 5:
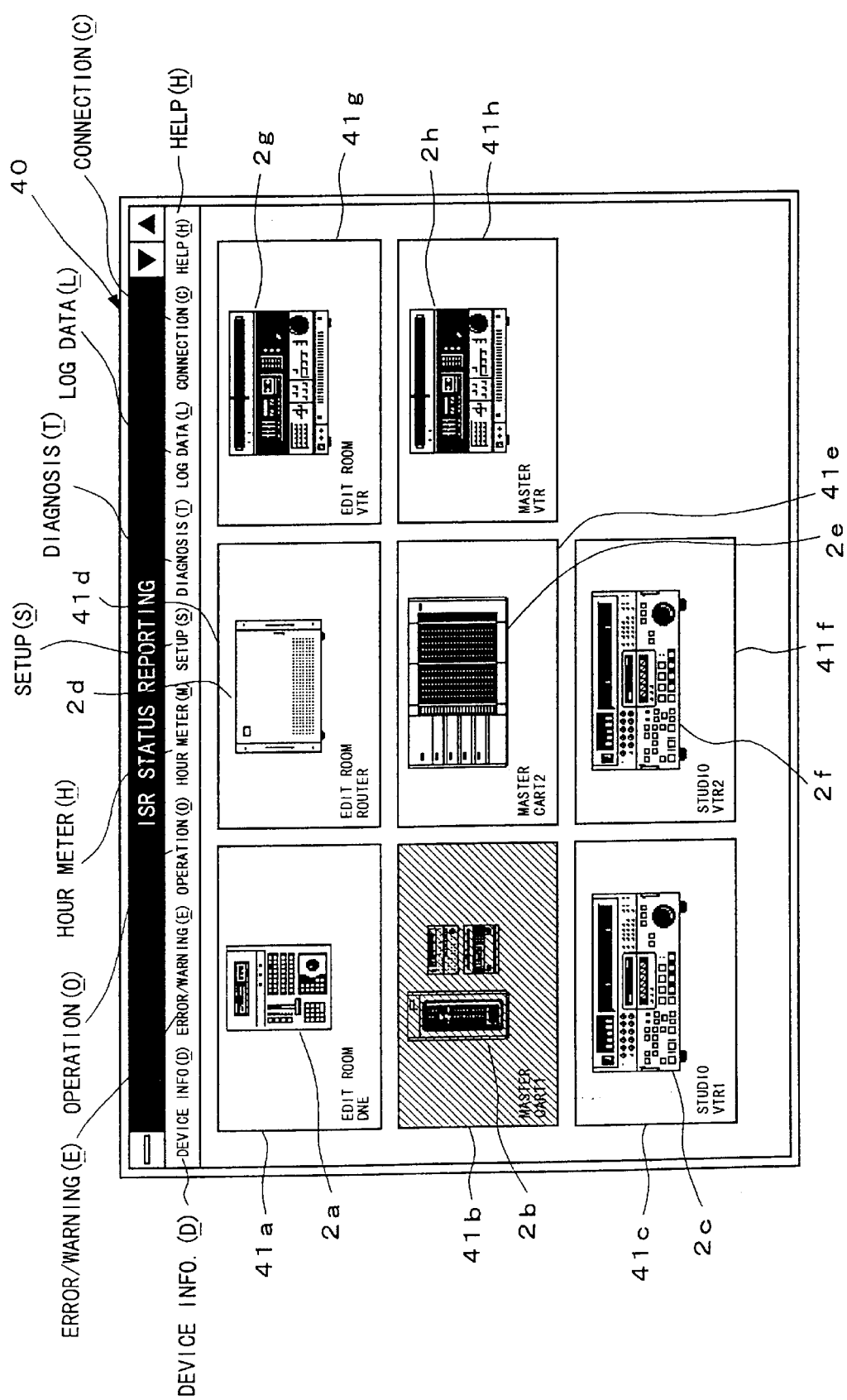
FIG. 5 is a diagram showing a main window of an error monitoring system according to the same embodiment of the invention.

The display 25 of the computer 1 first displays images of respective devices as shown in FIG. 5. This is the main window of the error monitoring system according to the embodiment. The main window 40 contains regions 41a through 41h in which actual outer aspects of connected video/audio devices 2a to 2h, sites of installment of the devices and device names.

By designating one of regions of 41a through 41h of the main window 40, a desired device is selected, and by pointing a desired position of the main window 40 through entry means 22 or 23, various functions to the device can be realized.

The main window 40 includes a menu bar 42 indicating a plurality of menu items above the regions 41a to 41h. "Device Info (D)" is to display information on a selected device. "Error/Warning (E)" is to display the history of errors or warnings of the selected device. "Operation (O)" is to display simple remote-control operations of the device instructed from the computer 1 and the current status of operation of the device such as "PLAY" or "REC". "Hour Meter (M)" is to display the sum of periods of time the selected device has ever been used. "Setup (S)" is to issue a setup command to the selected device. "Diagnosis (T)" is to activate the self-diagnosis function of the selected device. "Log Data" (L)" is to acquire and display various kinds of logs of the selected device through the communication server 21. "Connection (C)" is for logical connection of the designated device to the computer 1. The last "Help (H)" is for displaying on-line help messages regarding operations of the main window.

The background color of the regions 41a to 41h changes depending on the status of the device of a respective region as explained later. In this example, the status of the devices 2a to 2h in proper connection and with no error is determined as initial condition, and the background color of the initial condition is determined white.

Since video/audio devices 2a to 2h are connected to the computer by RS-232C in this example, the display 25 displays images of eight video/audio devices in FIG. 5. Also for the system shown in FIG. 2 where more video/audio devices are connected to the computer 1 by the LAN line, the display 25 displays images of all connected video/audio devices.

By thus displaying all connected video/audio devices by images, an operator can intuitively know respective devices.

When all device images are displayed within the area of a single window in a system connecting a large number of devices by a LAN line, for example, the display will be too crowded to see distinctively. In this case, the display 25 may be designed to scroll its content of display or to divide the content into some pages so that a single window displays images of only eight devices, for example. Alternatively, connected devices may be grouped according to a certain rule and some pages may be prepared for respective groups such that the windows can be switched as desired.

When an error occurs in a video/audio device (in this example, the video/audio device 2b) on the display 25, the background color of the region 41b in the main window 40 containing the video/audio device 2b is changed from white to a warning color, such as red flickers, under control of the central processing unit 20. If the central processing unit 20 simultaneously controls the sound source and causes the speaker to generate a signaling sound as an additional warning, then the system can more effectively draw an operator's attention.

The error may possibly be an error caused by insufficient connection between the device 2b to the communication bus other than an error of the video/audio device 2b itself. In this case, a different color, such as Magenta, may be used as the background color of the region 41b behind the image of the video/audio device 2b to indicate that the central processing device 20 and the communication server 21 do not acknowledge the video/audio device 2b. This also applies to indicating that the power switch of the video/audio device 2b is OFF.

Figure 6:
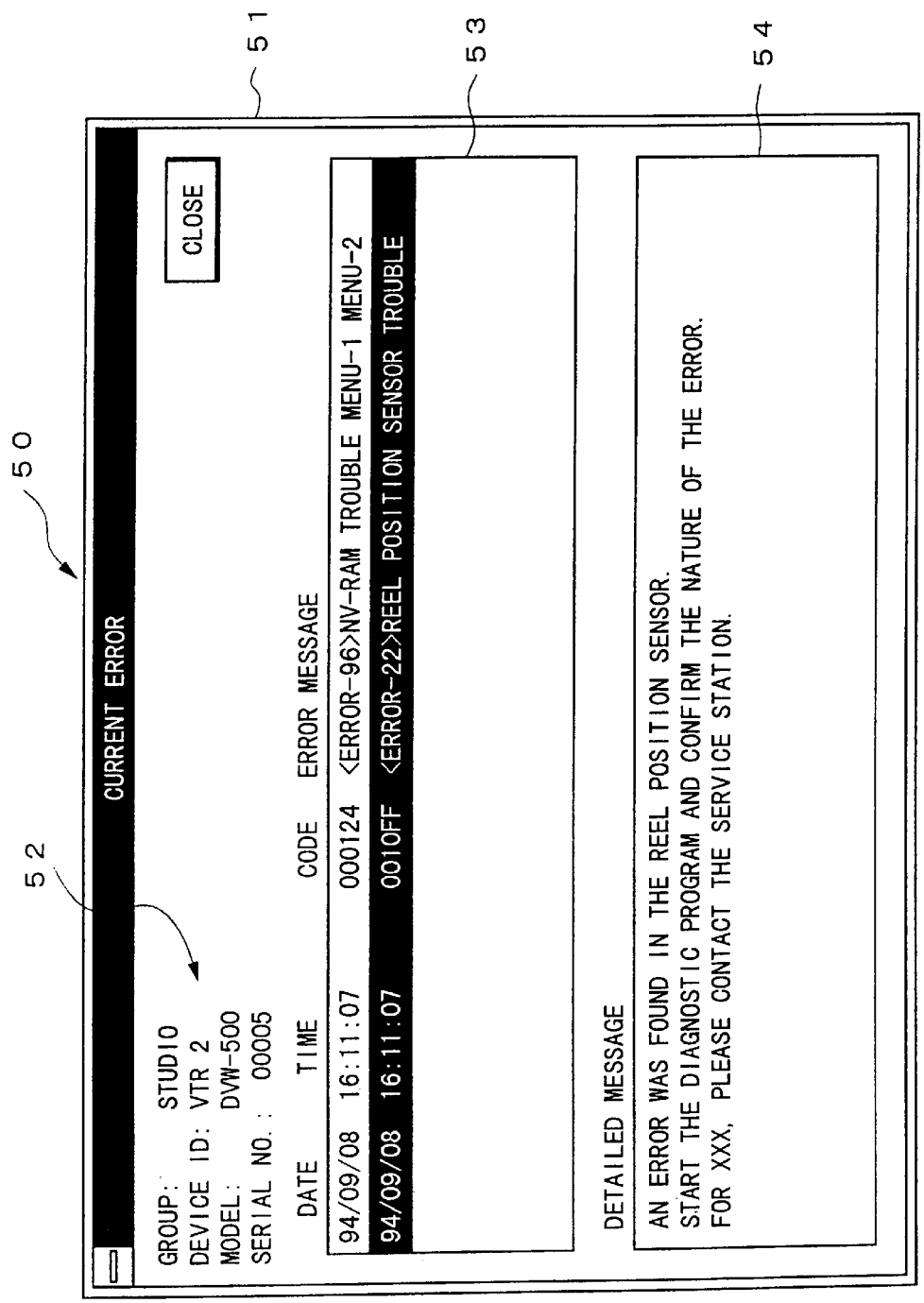
FIG. 6 is a diagram showing an error display window.

When a command indicating the nature of an error is returned back from the video/audio device (2b in this example) to the central processing unit 20, the central processing unit 20 opens on the display 25 a window for displaying the content of the error. Items on the window include an error code and an error massage in addition to the day and time when the error occurred, and ID of the device. FIG. 6 shows an example of the window indicating the error. In this fashion, the error display window 50 displays error information of a single video/audio device.

Figure 7:
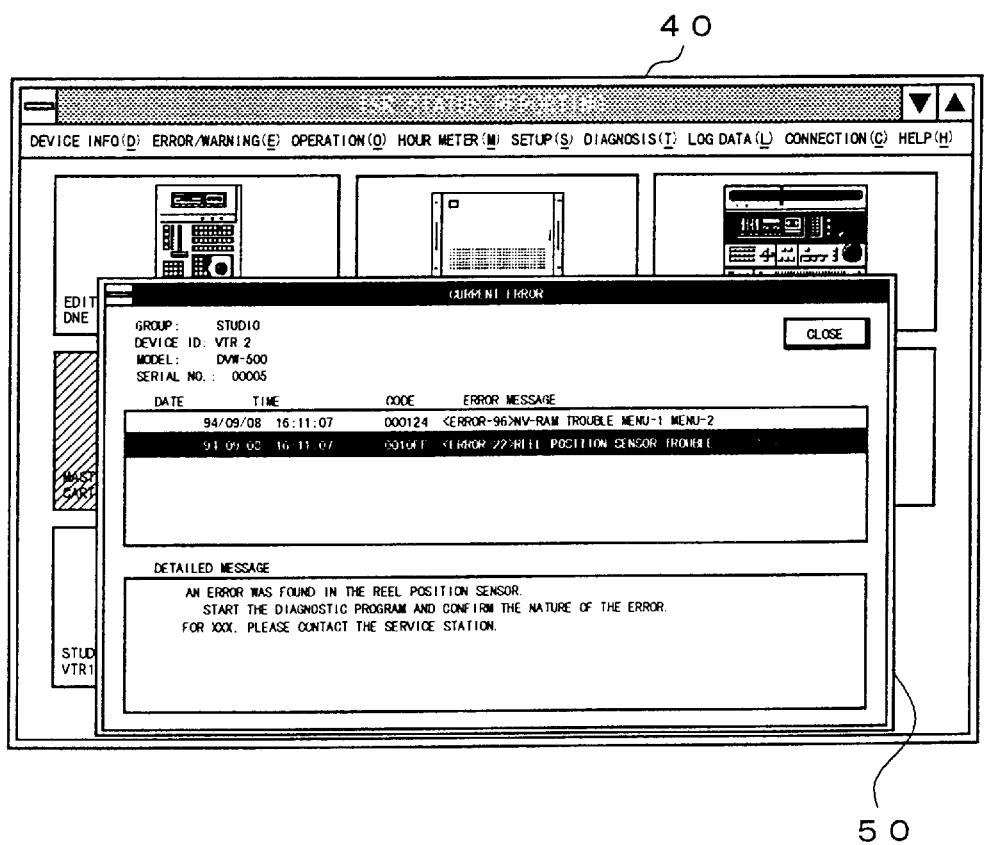
FIG. 7 is a diagram of a multi-window including both the main window and the error display window on the same display.

The error display window 50 is opened on the display together with the main window 40. FIG. 7 shows an example of simultaneous display of both the main window 40 and the error display window 50. As shown, the error display window 40 is superposed on the main window 50.

In this example, an error message and an error code are supplied from the video/audio device 2b. This intends to enable any desired determination of the relation between the error code and the error message on the part of the device. Although display of an error message is possible by storing previously prepared error messages in the memory/disc device 24 of the computer 1 and by establishing a table coupling error codes with the error messages, this design makes it difficult to renew error messages on the part of devices upon replacement of a device by another or version-up of ROMs.

It is possible that errors occur in parallel in some devices. In this case, a corresponding number of error display windows 50 are shown in offset stacked layers toward the right bottom. In this fashion, all error display windows 50 of all devices involving errors can be displayed on the display 25. In this case, the window of the latest error information overlies the others.

The outer frame 51 of the error display window 50 flashes with flickers synchronizing with the red flickers of the region 41b on the main window 40 to link the error display window 50 with the image of the device containing the error. This makes it easy for an operator to know which device involves whichever error even when errors occur concurrently in multiple devices.

In FIG. 6, "Group" indicates the group to which the video/audio device 2b having the error belongs. In this example, the title of the room in which the device 2b is settled is used as the "Group". "Device ID", "Model" and "Serial No." identify the device 2b.

Information on the error occurring in the device 2b is shown in an error display column 53. The information includes an error code and an error message obtained by the above-explained status command in addition to the day and time when the error occurred. The reverse-imaged line indicates that a specific error is currently displayed according to instructions from an operator through an entry device such as mouse 22 or keyboard 23.

In a detailed message column 54, a detailed message about the pointed specific error is displayed. Detailed messages are previously prepared and stored in the memory/disc device 24 of the computer 1. They are displayed in a predetermined linkage with error codes and error massages directly obtained from devices by way of status commands. They may be made in form of a data base in combination with error codes, error massages and detailed error messages. Alternatively, a table linking detailed error messages only with error codes may be made.

The error display window 50 can be closed by pointing the box labelled "Close" at the upper right position inn the window through the entry device 22 or 23.

The background color in each device image region on the main window 40, flickers of the outer frame 54 of the error display window 50, and warning sound can be canceled, for example, by closing the error display window or by pressing the escape key on the keyboard 23. In this case, if an error still remains in a device, the background color of the image display region for the device in the main window 40 is changed to, for example, red light. When the device restores from the error, flickers and warning sound are automatically canceled, and the background color behind the device image is changed to white light indicating that no error exists in the device as explained later.

When errors occur in parallel in multiple devices and some error display windows 50 are displayed, by closing the uppermost error display window, the next window appears on the front, and its outer frame 54 flashes with flickers. In this case, the warning sound is synchronized with flickers of the outer frame 54 of the error display window 50 currently in the uppermost layer.

A command is sent from the central processing unit 20 through the communication server 21 to respective video/audio devices to collect results of their error detections. The error detection command is circularly sent to all video/audio devices connected to the system, for example, starting from the video/audio device 2a, next to the video/audio device 2b, and further to the video/audio device 2c, et seq. Devices that detect errors reply to the error detection command by returning back predetermined error codes indicating natures of the errors.

Issuance of the error detection command to the connected video/audio devices is effected periodically, for example, every several seconds. Alternatively, it may be done at a fixed point of time. It is also possible to employ a more flexible way, such as executing it as frequent as possible in accordance with the ability of the central processing unit 20, in stead of publishing the command on a predetermined time basis, either periodical or at fixed times.

More specifically, the central processing unit 20 issues and supplies an error detection command to the communication server 21. In this example connecting video/audio devices to the computer 1 by RS-232C as shown in FIG. 1, the command is converted into the protocol of RS-232C by the communication server 21, and directly delivered to the video/audio devices 2a to 2h.

In the case where video/audio devices are connected to the computer 1 by the LAN line 12 such as Ethernet as shown in FIG. 2, the command supplied to the communication server 21 is converted into the protocol of the LAN line (TCP/IP in this example) by the communication server 21. Then, the command in converted form of the TCP/IP protocol is supplied to the terminal servers 17a to 17d through the LAN line 12. In the terminal servers 17a to 17d, it is again converted into protocols in comply with RS-232C, which are defined by the error monitoring system for respective video/audio devices connected to the system, and then supplied to the respective video/audio devices.

When the error detection command sent to video/audio devices connected to the system is received by the devices, commands indicating error conditions are sent out from the respective devices. The error status command typically comprises an error code indicating an error in the device. The error code discriminately indicates the status of the device in form of a code made of six digit numerals, for example, whether the device is in an error, or in a status other than an error but to be warned (warned status). Error codes may be determined to indicate errors by codes of "010000" and larger numerals, warned statuses by codes of numerals smaller than the same, and no error status by the code of "000000".

Error status commands sent from the video/audio devices 2a to 2h are received by the computer 1 and delivered to the central processing unit 20. If there is any device whose error code is shown in the error status commands, then the background color of the display regions 41b behind the device image of the video/audio device 2b on the main window 40 of the display 25 is changed from white indicating the initial status into to another color an operator's attention to occurrence of the error, such as red flickers, under control of the central processing unit 20.

The central processing unit 20 next issues a command to the video/audio device 2b containing the error through the communication server 21, which requests information on the nature of the error. The video/audio device 2b in receipt of the command returns a status command indicating the nature of the error to the central processing unit 20 through the communication server 21. The status command is, for example, an error message previously prepared and stored in the video/audio device.

Based on the received status command, the central processing unit 20 opens a window displaying the nature of the error on the display 25. This is the error display window 50 already explained with reference to FIG. 6.

The memory/disc device 24 of the computer 1 stores the error history file accumulating all errors ever experienced as shown in FIG. 4. The error code, error message, day and time where the error occurred, and device information that experienced the error, and so forth, are added to the error history file to renew it.

Since error history files are managed and renewed for discrete video/audio devices, prior knowledge on the tendency of errors likely to occur in each device can be obtained by analyzing its error history file. In addition, by such analysis on all video/audio devices connected to the system, varieties in frequency of use between respective devices, for example, can be known and utilized for easier management of devices.

The error history file has been explained above as containing error codes, error messages, dates and times of errors, and device information on the device that experienced errors; however, the contents of the error history file are not limited to these items. For example, information on the version of ROM installed in the device may be added to the error history file so that an operator can get the information on the ROM's version on the computer 1, which could not be known without opening the cover of the device in conventional systems. This makes it easier to cope with bugs or other problems in ROM.

Figure 8:
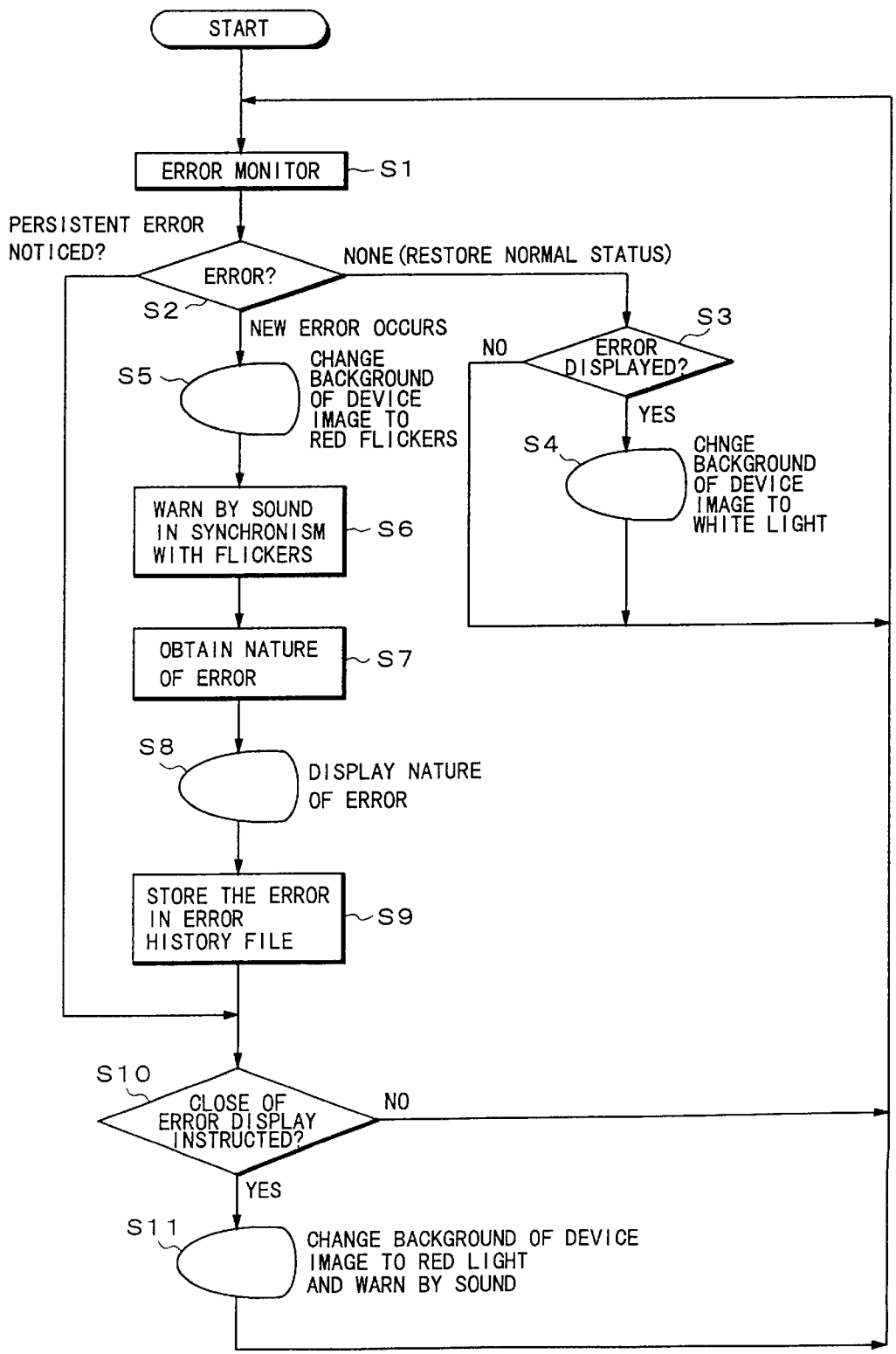
FIG. 8 is a flow chart of an error monitoring process according to the same embodiment of the invention.

FIG. 8 shows a flow chart of an error monitoring process according to an embodiment of the invention. In the first step S1, the error monitoring process is started, and an error detection command is sent out to the video/audio devices 2a to 2h connected to the computer 1. Based on error status commands sent from the video/audio devices 2a to 2h in response to the error detection command, it is judged in step S2 whether any error exists or not.

If no error is found in any devices connected to the system in step S2, the process proceeds to step S3. In step S3, it is judged whether any error is displayed on the main window 40. If an error display of the preceding error monitoring process, for example, still remains on the display, the process proceeds to step S4 to change the error indicating background color behind the device image on the main window 40 into white light indicating that no error exists. Then, the process returns to step S1 to start the next error monitoring process.

In step S2, if an error status command including an error code indicating the existence of an error is returned from any video/audio device connected to the system, and if it is judged that a new error has occurred in the device, the process goes to step S5. In step S5, the background color behind the device image of the video/audio device conceiving the error on the main window 40 is changed to red flickers drawing an operator's attention. Then, the process proceeds to step S6 to generate a warning sound in synchronism with the flickers.

After the notice on the error is given to the operator in steps S5 and S6, the process goes to step S7. In step S7, the nature of the error is acquired from the video/audio device conceiving the error. That is, the computer 1 issues a command to the video/audio device having the error to instruct it to inform the nature of the error, and the device in receipt of the command returns a status command including an error message to the computer 1. The status command is received by the computer 1, and the nature of the error is acquired.

After the nature of the error in the device is acquired by the computer 1, the process moves to step S8. In step S8, the error display window 50 is opened on the display 25, and the acquired nature of the error is displayed. In response to an instruction by the operator, a detailed message regarding the error is displayed on the detailed message column 54.

In the next step S9, information concerning the error, including information on the device conceiving the error, day and time of the error, error code and error message, is written in the error history file stored in the memory/disc device 24 to renew the error history file. After renewal of the error history file, the process proceeds to step S10.

In step S10, it is judged whether the operator has entered a "Close" instruction to the computer 1 to close the error display window opened in step S8. If not, the display is maintained in the flickering status, and the process returns to step S1 to start the next error monitoring process.

If the "Close" instruction has been entered, the process moves to step S 11 to first close the error display window 50. Then, the background color behind the device image of the outstanding video/audio device on the main window 40 is changed from red flickers to red light. After the change on the display in step S11, the process returns to step S1 to start the next error monitoring process.

If an error in a video/audio device detected in step S2 is one that has been held since the preceding error monitoring process and already noticed, the process goes to step S10 to execute processing to the error display window 40.

Error monitoring operations by the error monitoring system against video/audio devices according to the invention are thus performed by repeating the process explained above with reference to the flow chart in predetermined intervals.

In the embodiment shown above, red flickering light is used as the background color behind the image of a device in error, and Magenta is used to indicate insufficient connection between the device and the error monitoring system; however, the invention is not limited to this example. More preferably, the display may be changed as follows for natures of different error codes the computer 1 receives.

white: proper connection to and normal status of an video/audio device;

grey: failure of logical connection with the device;

red flickers: occurrence of an error in the device;

orange: warned status of the device;

Magenta: insufficient connection between the device and the error monitoring system;

blue: the device during self diagnosis.

By setting background colors of devices in this manner, the operator can directly know statuses of respective devices.

Figure 9:
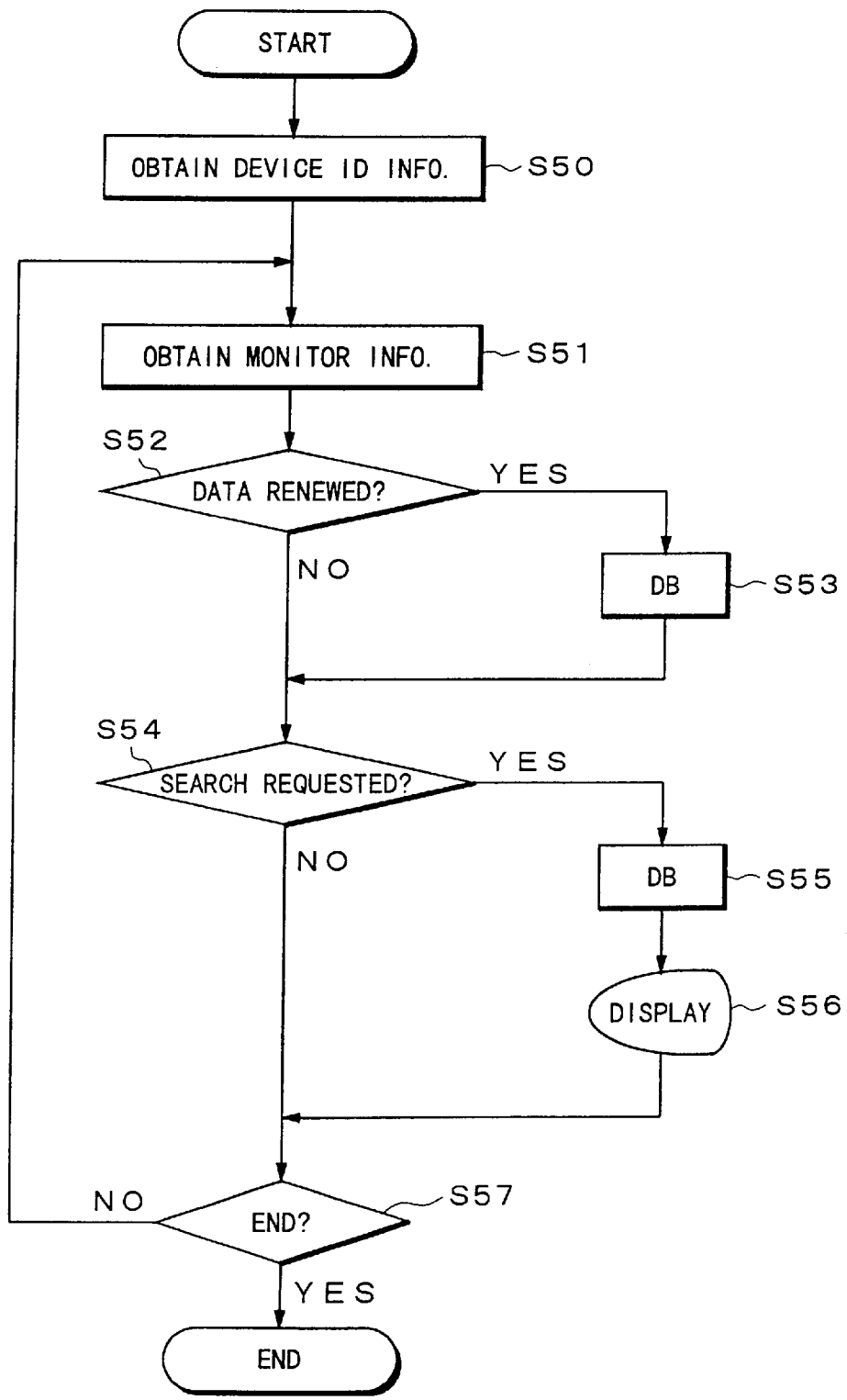
FIG. 9 is a flow chart of a process taken with the data base according to the invention.

Next explained is a process of establishing and managing the data base in the memory/disc device 24 with reference the flow chart shown in FIG. 9. The explanation is directed basically to the example of FIG. 1 connecting eight video/audio devices 2a to 2h to the computer 1 by RS-232C.

The central processing unit 20 starts communication with the video/audio devices via the communication server 21 and issues a command to the video/audio devices connected to the respective ports of the communication server 21 to request device identifying information. The video/audio devices in receipt of the command deliver their device identifying information to the central processing unit 20. The device identifying information is acquired by the central processing unit 20, and written in the port management files 30 in the memory/disc device 24 linked to individual ports of the communication server 21 (step S50).

When the device identifying information from respective devices is acquired at the central processing unit 20, the main window 40 is opened on the display 25 as explained above. Based on the device identifying information of the devices, images of the devices are displayed on regions 41a to 41h in the window 40. These device images are previously stored in the memory/disc device 24 and linked to corresponding device identifying information by an appropriate method.

A further command is sent to certain devices such as digital video tape recorders among audio/video devices connected to the computer 1 to request channel condition information and hour meter information for use as device monitoring information. Video/audio devices in receipt of the device monitoring information request command send back device monitoring information to the computer 1, and the computer 1 acquires the device monitoring information together with the error information mentioned above (step S51). Also the acquired device monitoring information, like the error information, is stored in the memory of the computer 1.

The command for requesting channel condition information and hour meter information is sent once a day, for example.

If a memo for a particular video/audio device is desired to be kept, a user may open the memo file of the particular device in the computer 1 through an appropriate memo information entry means such as editor, and can describe a desired memo.

The channel condition information among the error information and the device monitoring information acquired by the computer by communication with the video/audio devices is compared with the corresponding information stored latest on the memory of the computer 1. By checking whether any instruction is entered to the memo information entry means through the keyboard or mouse, it is confirmed whether any change is made in the memo file.

If step S52 results in confirming any change in the files, the process proceeds to step S53 to renew the files and write them in the data base. Renewal of history files is made by adding new information to corresponding current files. Renewal of memo files is made by rewriting. Details of renewal of files and writing in the data base in step S53 will be described later.

If step S52 results in confirming no change in device monitoring information, error information and memo files, the process goes to step S54. In step S54, it is reviewed whether there is a device information search request from a user to the computer 1, which is a request to search out device identifying information, device monitoring information or memo information regarding a desired video/audio device from the data base.

If any search request is found, the item to be searched is previously designated in step S54. A search request for device information is given by pointing a desired device image displayed on the main window 40 of the display 25 through the entry device 22 or 23. Then, the process moves to step S55 to conduct searches for device information. Details of the search process in step S55 will be described later. When the requested search in step S55 is finished, the process goes to the next step S56. In step S56, results of the search is displayed on the display 25. After the display of the result of the search, the process proceeds to step S57.

If step S54 results in confirming no search request from the user, the process moves to step S57. In step S57, it is judged whether operations of the error monitor/management itself have been finished.

If step S57 results in judging that operations of the system are still running, then the process returns to step S51 to once again acquire device monitoring information.

If step S57 results in judging that operations of the system are finished, a series of operations concerning error monitoring against video/audio devices and data base terminate.

Figure 10:
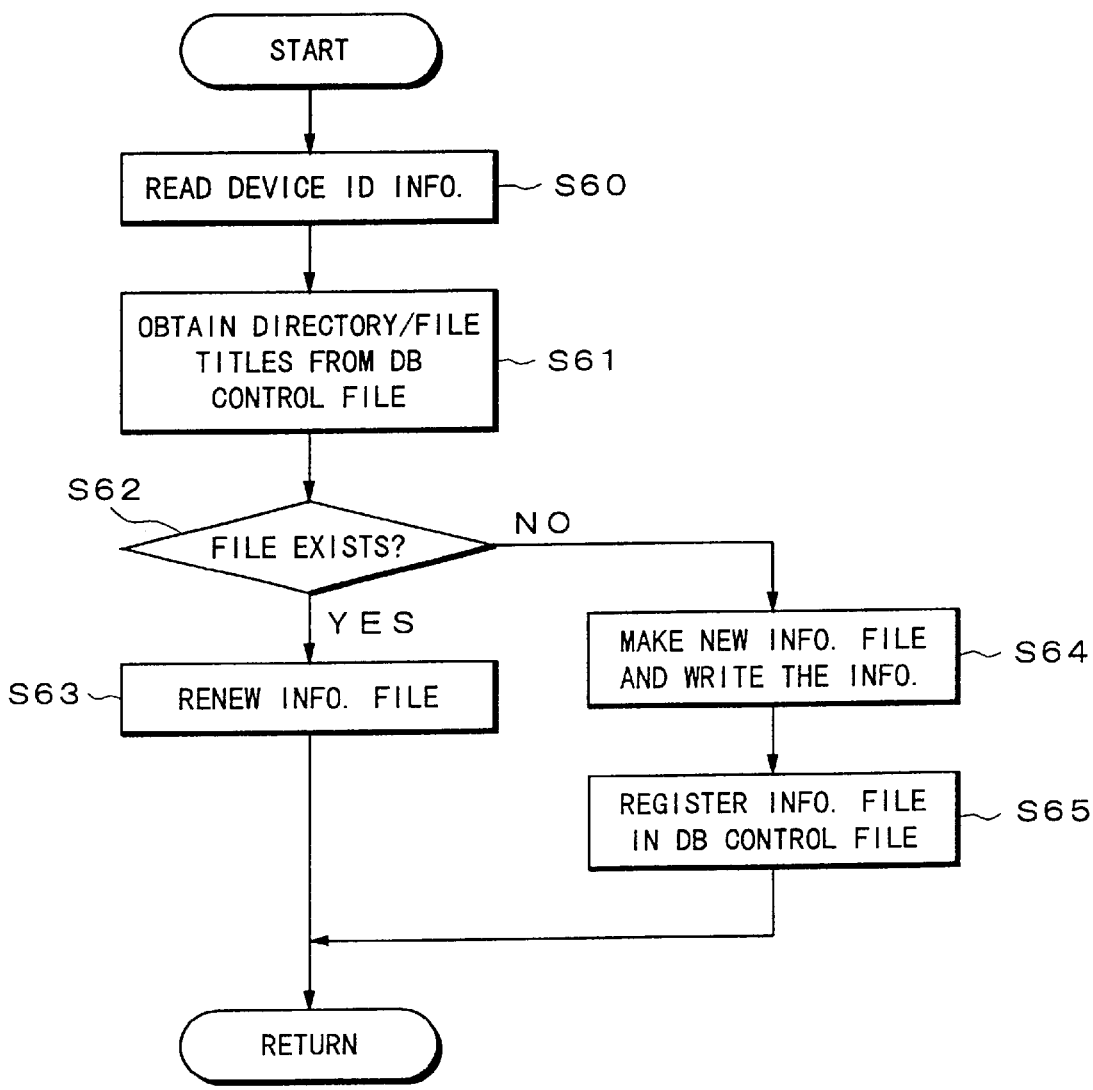
FIG. 10 is a flow chart of a detailed process of writing into the data base.

FIG. 10 is a detailed flow chart of the process for writing into data base in step S53 explained above. When any renewal of data is found in step S52 in the main routine, device identifying information of a target device, e.g. the device identifying information a, is read out in step S60 from the port management file 30, referring to the port number of the device as an index.

In the next step S61, referring to the device identifying information a read out in step S60 as its index, the directory name and title of the file where the information file of the target device is stored are read out and acquired from the information files r to u in the data base management file 31. Then, the process moves to step S62.

In step S62, it is judged whether the directory and the file with the directory name and title of the file acquired in step S61 actually exist in the memory/disc device 24. If their existence is confirmed, the process moves to step S63, and the target information file is renewed. The renewal is done by adding changes in the error history file, channel condition history file and hour meter history file to the current files. Renewal of the memo file is done by rewriting the file; however, it may be done by adding new memos to the old file like the above history files. When renewal of information files is finished, a series of writing operations in the data base is also finished, the process goes to step S54 in the main routine of the error monitor/management system.

If step S62 results in judging that the directory and the file acquired in step S61 do not exist in the memory/disc device 24, the process goes to step S64. In step S64, a new directory and a new file are made with the directory name and the title of the file which were acquired in step S61, and the device monitoring information acquired in step S51 as explained before is written in the new file. Then, the process moves to step S65.

In step S65, the title of file and the directory name of the new file and directory made in step S64 are written and registered in the data base management file 31, using the device register information as their index. Then, a sequence of writing operations into the data base are finished, and the process moves to step S54 in the main routine of the error monitor/management system.

Figure 11:
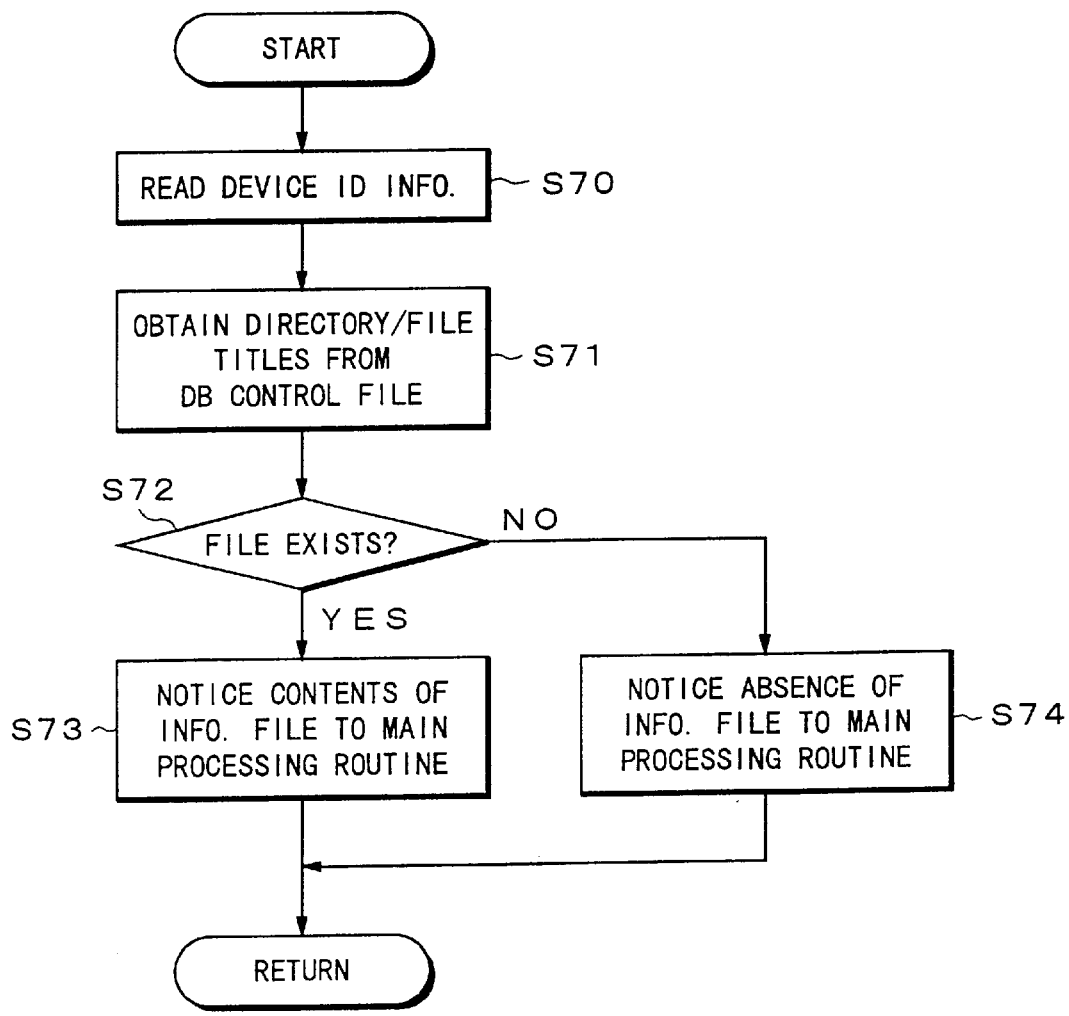
FIG. 11 is a flow chart of a detailed process of exploration into the data base.

As referred to above, the error monitor/management system permits a user to search out information on any desired video/audio device through operations on the main window 40. FIG. 11 shows a detailed flow chart of the search process in step S55 explained above. Designation of a target video/audio device to be searched may be done, for example, by pointing the device image of the target device among device images displayed on the main window 40 through the entry device 22 or 23. Alternatively, a user may select the target device image by double-clicking the mouse 22.

When a user wants to obtain, for example, the error history of a desired device, the "Error/Warning (E)" in the menu bar of the main window 40 is pointed after selection of the device image, for example. If the "Hour Meter (M)" is pointed after selection of the device image, searches for hour meter information of a desired device, i.e. operation hours, head hours and threading hours, are conducted. In this case, also channel condition information may be displayed simultaneously. In this manner, prior to the actual search for device information, contents of wanted device information are previously displayed in step S54 of the main routine.

As already explained, device images are displayed for respective ports of communication server 21 to which devices are connected. Therefore, when a target video/audio device is chosen, device identifying information indexed with the port number of the device is read out from the port management file 30 in step S70. Here let the device information a be read out.

When the purpose of the search is acquisition of device identifying information, the device identifying information 1 may be displayed on the display 25 as the result of the search in this step.

In the next step S71, using as an index the device identifying information a read out in step S70, the name of the target file and the name of the directory for storing the file are acquired from the data base management file 31. For example, if the desired information is the error history, the name of its file and the name of the directory storing the file are acquired by the information file r. Similarly, if the channel condition history, then by the information file s. If the hour meter history, then by the information file t. If the memo file, then by the information file u. After the directory name and the file name are acquired, the process moves to step S72.

In step S72, it is judged whether the directory and the file acquired in step S71 actually exist in the memory/disc device 24. If their existence is confirmed, the process moves to step S73, and the target file is read out from the information file group 32 (or information file group 32', 32", . . . ) with reference to the directory name and the file name acquired in step S71. If the desired information is the error history, for example, in step S54 of the main routine, then the error history file 32r is read out from the information file group 32.

As explained before, maximum 64 video/audio devices can be connected in an error monitoring system using a LAN line. Explained below is a further embodiment of the invention in which a system includes computers (room managers) set in different rooms to be in charge of error monitoring of individual rooms and includes a supervisor connected to a LAN line to govern the computers from a superior position (in this case, more than 64 devices can be connected in a single system).

Figure 12:
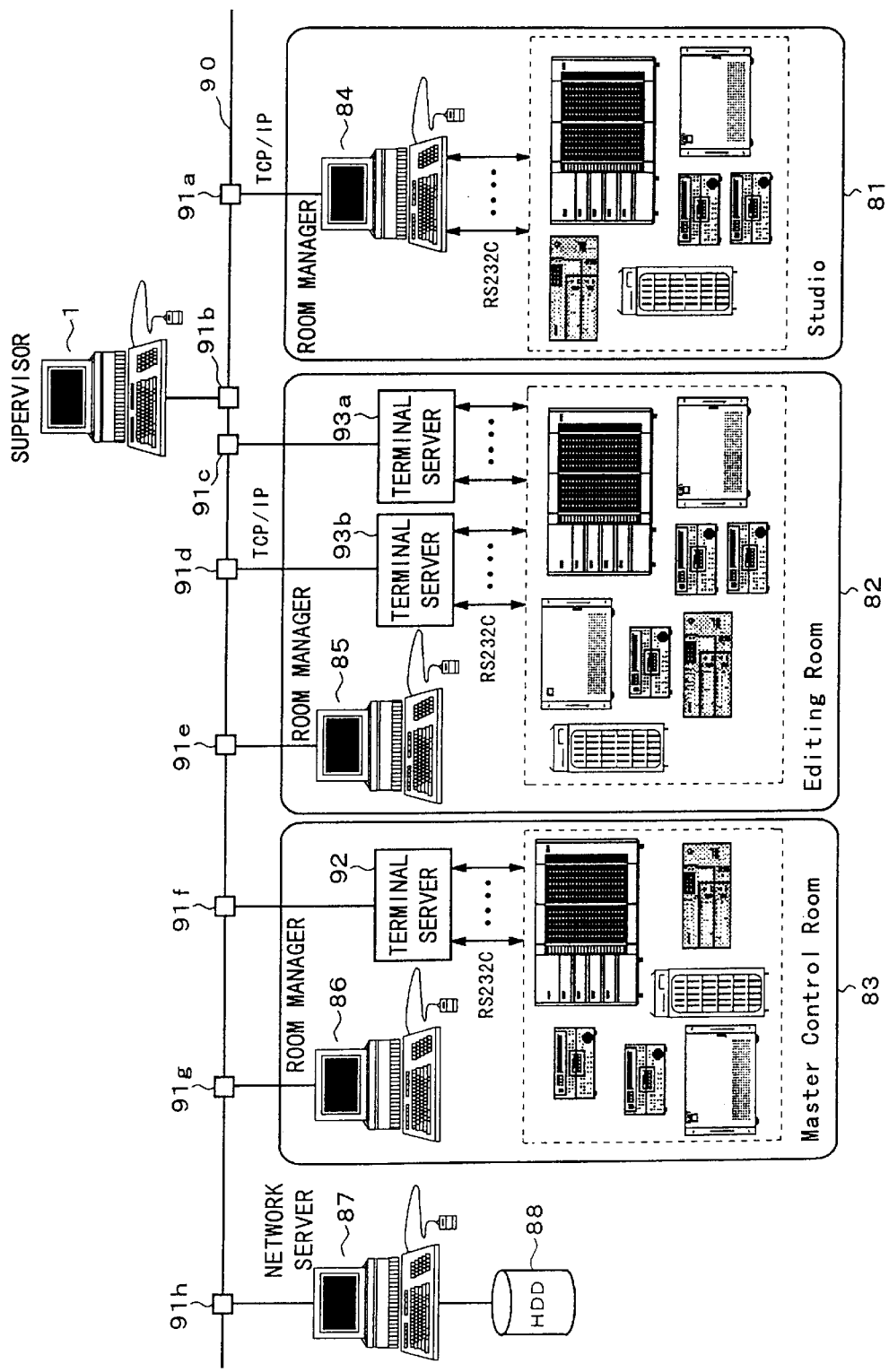
FIG. 12 is a diagram showing a physical construction of an error monitoring system according to a further embodiment of the invention.

FIG. 12 shows a physical construction of the error monitoring system connecting more than 64 video devices. The supervisor 1, which may be a computer, is connected to a LAN line 90 via a transceiver 91b by Ethernet having the TCP/IP communication protocol, for example. In this example, the error monitoring system is introduced to a studio 81 13 for collecting and recording video/audio materials, editing room 82 for compilation of video/audio materials, and master control room 83 for controlling broadcasting transmission, etc.

Room managers 83, 85, 86, which may be computers, are equipped in respective rooms 81, 82, 83, and are connected to the LAN line 90 through transceivers 91, 91e, 91g.

Also provided in the rooms 81, 82, 83 are a plurality of video/audio devices, respectively. These video/audio devices have an interface such as RS-232C, for example, and are controlled by the host computers while exchanging commands to perform error detection or self diagnosis.

In this example, video/audio devices set in the studio 81 are connected directly to the room manager 84 by RS-232C, for example. In this case, the number of video/audio devices that can be connected to the room manager 84 in the studio 81 is limited to eight due to restrictions imposed by the hardware as explained before.

Video/audio devices settled in the editing room 82 and those set in the master control room 83 are connected to the LAN line 90 through terminal servers 93a, 93b, 92, respectively. These terminal servers 93a, 93, 92 are used for conversion of protocols between TCP/IP and RS-232C. Video/audio devices set in the editing room 82 are connected to the terminal servers 93a, 93b via RS-232C, and further to the LAN line 90 through the transceiver 91d by the TCP/IP communication protocol from the terminal servers 93a, 93b.

Video/audio devices set in the master control room 83 are connected to the terminal server 92 via RS-232C, and the terminal server 92 is connected to the LAN line 90 via the transceiver 91f.

Also connected to the LAN line 90 is a network server 87 for controlling the LAN line 90. In a hard disc 88 connected to the network server 87, error management files of all video/audio devices are stored, and a data base concerning the system, LAN line, and so forth, is established. Read and write of data in and from the hard disc 88 is controlled by the network server.

Although the example is shown as providing individual room managers 84, 85, 86 in individual rooms, the invention is not limited to this aspect. Each of room managers is provided for video/audio devices in a single unit for management, which may be devices either in a common room rack or in any appropriate area.

The error monitoring system according to the invention is also applicable to an arrangement including video/audio devices set in a single room and a single room manager connected to these devices, instead of setting devices in different rooms. Since this arrangement makes it easy to extend the system to additional devices in additional rooms, it is very useful.

Figure 13:
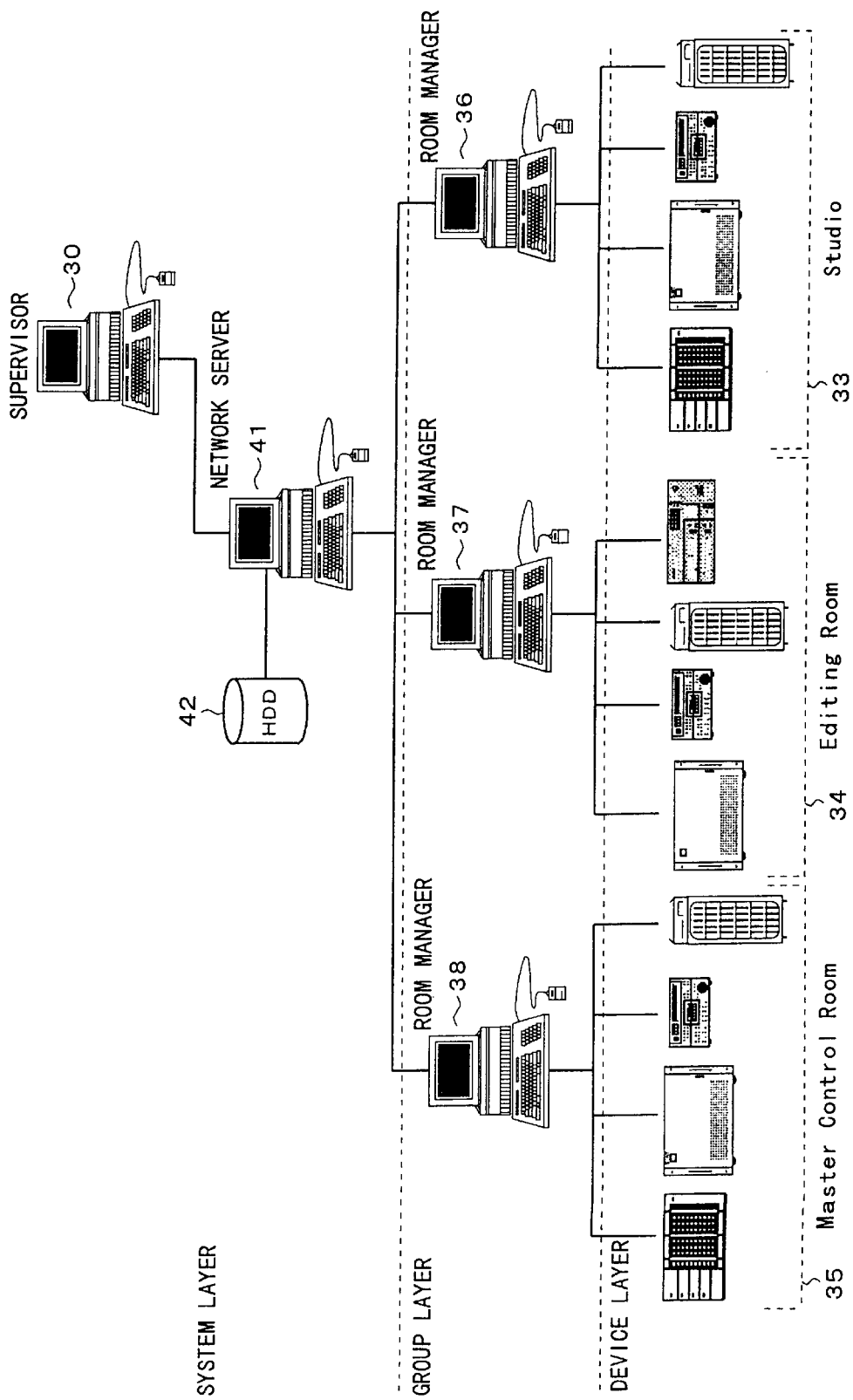
FIG. 13 is a diagram showing a logical construction of the same error monitoring system.

FIG. 13 shows a logical construction of the error monitoring system according to the invention, which corresponds to the physical construction shown in FIG. 12.

For simplicity, elements equivalent to those of FIG. 12 are labelled with common reference numerals.

As shown in FIG. 13, the error monitoring system according to the invention has a hierarchical structure logically divided into three layers. The device layer at the bottom is made up of various video/audio devices.

The intermediate group layer comprises a plurality of room managers (room managers 84, 85, 86 in this example) each taking charge of error detection of a predetermined block of video/audio devices in the device layer, such as those in each room, in each rack or in each area.

The system layer at the top comprises a supervisor 1 and a network server 87. Display of errors is done by the supervisor 1 for each of the room managers in the system layer. Thus, it is possible to monitor error statuses of all video/audio devices in the device layer.

The system layer and the group layer are connected with each other by a LAN line such as Ethernet. The group layer and the device layer are connected to the LAN line through terminal servers or with each other by RS-232C.

In the system logically divided into three hierarchical layers, each room manager executes error detection of video/audio devices under its own control. Detected error information is written in a hard disc 88 belonging to the system layer and connected to the network server 87. The error information written in the hard disc 88 is read out by the supervisor 1 belonging to the system layer.

As already explained, the maximum number of video/audio devices whose error can be monitored by a single computer connected to them is limited to, for example, 64. However, in the construction shown here, since the system has a logically hierarchical structure, apparent limitation to the number of connectable devices is removed, and much more video/audio devices can be put under error monitoring by a single system.

In actual applications, since a limitation is imposed in performance due to the ability of a computer employed, the traffic restriction in the LAN line, the capacity of the data base in the network server 87, the number of connectable video/audio devices is limited.

Figure 14:
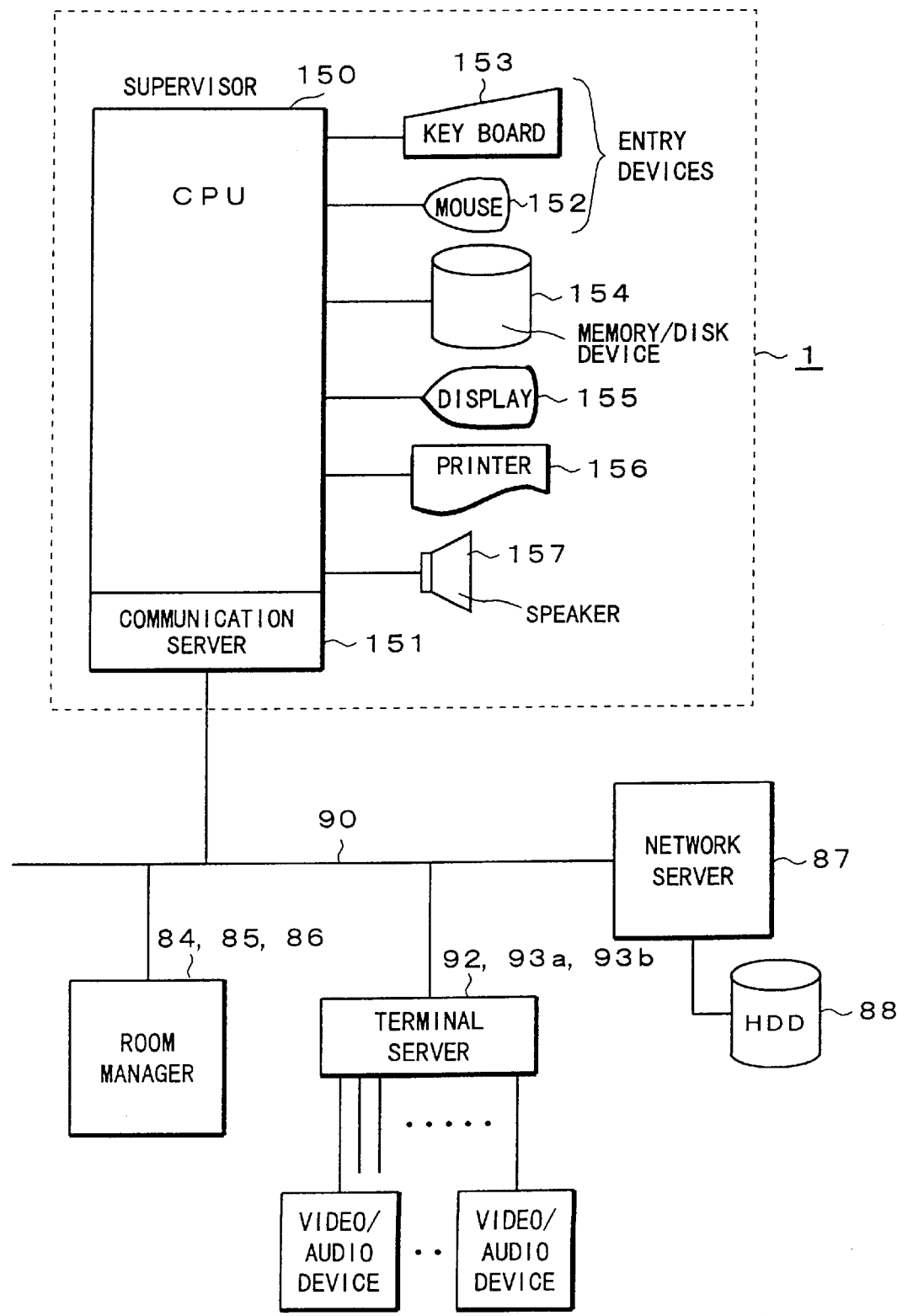
FIG. 14 is a block diagram of a construction of a supervisor and its connection to other peripheral devices.

FIG. 14 shows an exemplary construction of the supervisor 1 and its connection to peripheral devices. A communication server 151 in accordance with TCP/IP, for example, as an interface with the LAN line 90 is connected to a central processing unit 150 including CPU, memory, and so on.

Also connected to the central processing unit 150 are entry devices such as mouse 152 and keyboard 153 through which an operator can enter various sorts of information or instructions to the supervisor 1. Entry of information or instructions may be done either by communication from an external computer connected by the LAN line, for example, or by reading data from an externally prepared recording medium such as floppy disc.

A memory/disc device 154 used as an external storage device may be a hard disc in which various data and a program for the central processing unit 150 are stored. Messages from the central processing unit 150 and information sent from the room managers 84, 85, 86 connected via the communication server 151 are displayed on a display 155 in form of CRT, for example. These messages and information can be printed out by a printer 156.

The computer 1 is also equipped with a speaker 157 as a sound source for generating sounds under control of the central processing unit 150.

Next explained are error monitoring operations against video/audio devices in a system as shown in FIGS. 12 and 13 where more than 64 video/audio devices are connected.

Figure 15:
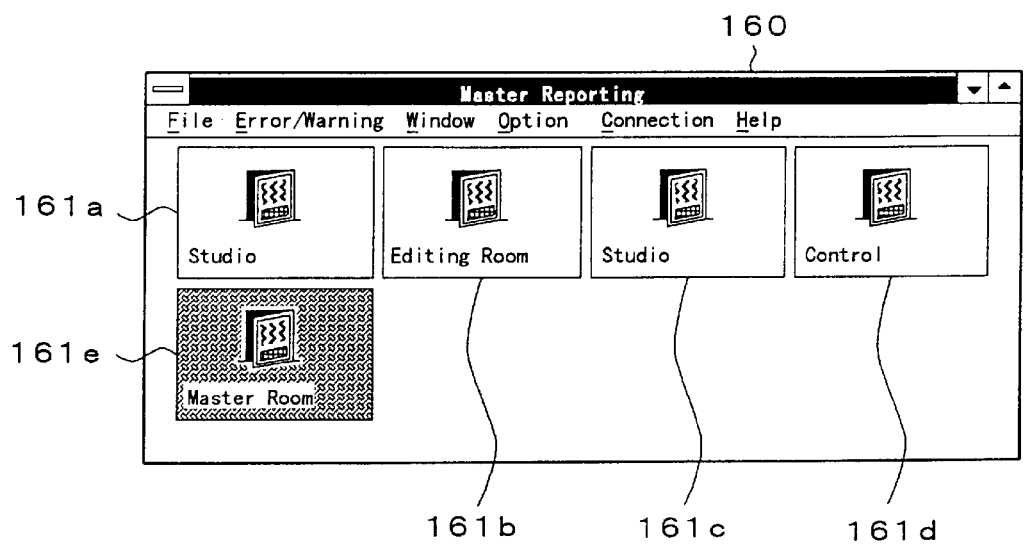
FIG. 15 is a diagram showing a main window on a display of the supervisor.

As shown in FIG. 15, the display 155 of the supervisor 1 displays images of the studio, editing room, master control room, and so forth, in respective sites of all connected room managers. This is the main window of the error monitoring system connecting more than 64 video/devices. The main window 160 prepares regions 161a through 161e for indicating the sites of installment of the room managers. Doors are shown in the regions 161a to 161e to give an operator images on the respective rooms.

Although the illustrated example expresses images of the rooms by doors, the system may use any other way of expression, such as simple plan view of the building on which respective rooms are emphasized in an appropriate manner. Additionally, since the room managers are provided for every block of video/audio devices to be managed thereby as explained above, other appropriate images straightforwardly expressing respective blocks can be used.

The background color of the regions 161a to 161h on the main window 160 changes with information sent from the room managers in respective rooms shown in the regions. In this example, the normal condition in which no error exists in devices set in each room is determined as the initial condition, and the background color of the initial condition is determined white. In the illustrated example, it is indicated that some trouble exits in a device in the room shown in the region 161e.

Each room manager in each room belonging to the group layer takes charge of error detection against video/audio devices in the device layer to be managed by the room manager. Explanation on error detection is directed to the master control room 83 in which video/audio devices are connected to the LAN line via the room manager 86 and the terminal server 92. Of course, the same explanation also applies to the editing room 82 in that video/audio devices are connected by the LAN line 90 via the terminal servers 93a, 93b.

An error detection command is sent from the room manager 86 to the terminal server 92 in the protocol of the LAN line (TCP/IP in this example) to collect results of error detection by video/audio devices. The error detection command is converted into a protocol of the connected video/audio devices (RS-232C in this example), and then supplied to the video/audio devices in the device layer. The error detection command is circularly sent to all video/audio devices under control of the room manager 86. In response to the error detection command, devices containing errors send back error codes indicating natures of the errors.

In case of the studio 81 where video/audio devices and the room manager 84 are connected by RS-232C, the room manager 84 issues a command for introducing error detection results to the connected video/audio devices. That is, the room manager 84 supplies it directly to the connected video/audio devices by the RS-232C protocol.

Issuance of the error detection command to the connected video/audio devices is effected periodically, for example, every several seconds. Alternatively, it may be sent at a fixed point of time. It is also possible to employ a more flexible way, such as sending it as frequent as possible in accordance with the ability of the room manager 84, instead of publishing the command on a predetermined time basis, either periodical or at fixed times.

When the error detection command sent to video/audio devices connected to the system is received by the devices, status commands are sent out from the respective devices. The status command typically comprises an ID identifying an individual device and an error code. The error code discriminately indicates the status of the device by a code in form of six digit numerals, for example, whether the device is in an error, or in a status other than an error but to be warned (warned status). Error codes may be determined to indicate errors by codes of "010000" and larger numerals, warned statuses by codes of numerals smaller than the same, and no error status by the code of "000000".

Status commands sent from respective video/audio devices in the master control room 83 are converted in protocol via the terminal server 92, and then received by the room manager 86 in the group layer. When it is detected that an error exists in any video/audio device in the device layer under the control of the room manager 86, the room manager 86 issues a request command to the video/audio device containing the error to command it to deliver more detailed information on the error. The request command is sent from the room manager 86 in the group layer to outstanding video/audio devices in the device layer via the terminal server 92.

The video/audio device in receipt of the request command publishes letters describing the detailed nature of the error to the room manager 86 in the group layer through the terminal server 92.

When the room manager 86 receives the written nature of the error and acquires detailed information on the error, the error information is sent to the network server 87 belonging to the system layer. Then, the network server 87 delivers the error information to the hard disc 88 and makes it to store and hold the information as an error information file.

The supervisor 1 in the system layer periodically checks through the network server 87 whether any new information has been written in the hard disc 88. The check is effected periodically, for example, every few seconds, every decades of seconds, or every few minutes. Alternatively, it may be sent at a fixed point of time. It is also possible to employ a more flexible way, such as checking it as frequent as possible in accordance with actual abilities of the supervisor 1 and the network server 87, in stead of determining a predetermined time basis, either periodical or at fixed times.

If any error is found out in a device whose error information file was read out as a result of the check of the hard disc by the supervisor 1, then the supervisor 1 read out the day and time of the error, content of the error, error ID indicating the error, device ID indicating the device containing the error, information on the room manager controlling the device containing the error, an so on, from the error information file. These pieces of information read out from the file is written in the memory/hard disc device 154 of the supervisor 1.

Here is assumed that an error is found in one of video/audio devices under the control of the room manager 86.

Based on the error information read out from the file, the image of the room containing the device having the error is emphasized on the main window 160 of the display 155 of the supervisor 1. The emphasis is made by changing the background color in the region of the outstanding room from white indicating the normal condition into red indicating the existence of the error. In this case, the use of red flickers as the background color is more effective to reliably draw the attention of the supervisor operator to the existence of the error. In the example of FIG. 15, the region 161e corresponds to the room (master control room 83 in this example) in which the device having the error is placed. It is also possible to generate a signalling sound as an additional warning in synchronism with the red flickers to draw an operator's attention through his auditory sense.

Figure 16:
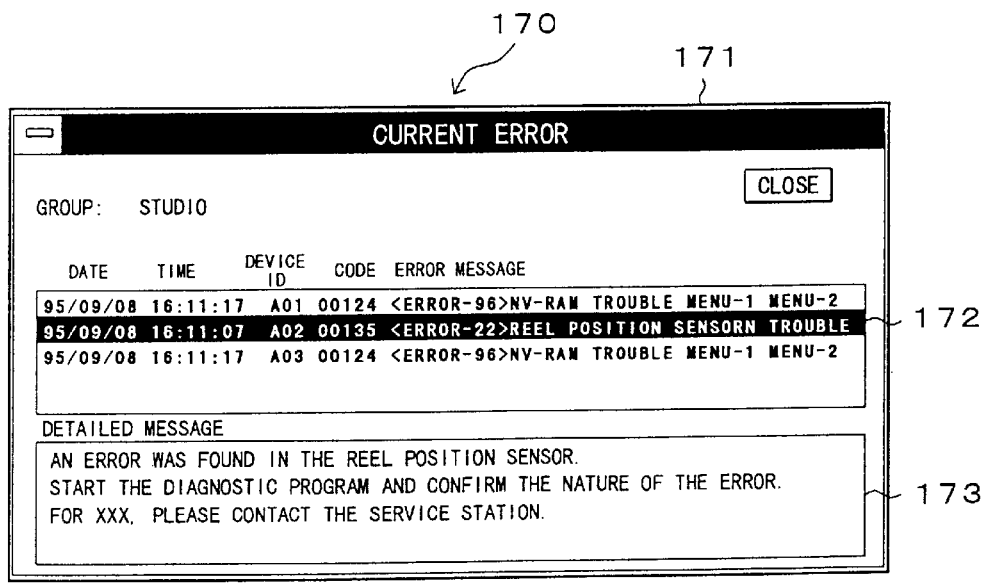
FIG. 16 is a diagram showing an error display window on the display of the supervisor.

Under the control of the central processing unit 150, an error display window 170 is opened on the display 155 to display the nature of the error as shown in FIG. 16. The error display window 170 displays error information on all devices having errors among those in the corresponding room. The error display window 170 is opened on the display together with the main window 160 explained above. It is also possible to simultaneously open the error display window 170 on the main window 160 together with the main window 40 shown in FIG. 5 which displays video/audio devices in a respective room. It is also possible to switch the main window 160 to the main window displaying respective video/audio devices by selecting the error-containing room on the main window 160 through the entry device, such as clicks to the mouse 152 or entry of a command from the keyboard 153 such that the main window 40 is opened simultaneously with the error display window 170 as shown in FIG. 7.

It is possible that errors occur in parallel in some devices. In this case, a plurality of error display windows 170 are opened on the display 155 in offset stacked layers toward the right bottom. In this fashion, error display windows 170 for all layers containing errors can be displayed on the display 25.

The outer frame 171 of the error display window 170 flashes with flickers synchronizing with the red flickers of the display region 161b on the main window 160 to link the error display window 170 with the image of the room containing the error. This makes it easy for an operator to know which device in which room involves whichever error even when errors occur concurrently in multiple devices in multiple rooms.

Among items on the display in FIG. 16, "Group" indicates the room in which a video/audio device containing an error is located. Shown in the error display column 172 is information on the error that occurred in the room shown in the region 161e. In this example, an error exists in each of three video/audio devices. The information displayed includes, in addition to the day and time of the error and the device ID, error code and error message which are obtained from the status command and written contents of the error explained above. The reverse-imaged line indicates that a specific error is currently displayed according to instructions from an operator through an entry devices such as mouse 152 or keyboard 153.

In a detailed message column 173, a detailed message about the selected specific error is displayed. Detailed messages are previously prepared and stored in the memory/disc device 154 of the supervisor 150. They are displayed in a predetermined linkage with device IDs, error codes and error massages. They may be made in form of a data base in combination with error codes, error massages, both to be displayed in the error display column, and detailed error messages to be displayed in the detailed error message column. In this case, a more detailed message shown in the detailed message column 173 is displayed on the display 155 by appropriate mapping detailed messages relative to error codes and error message. Alternatively, a table linking detailed error messages only with error codes may be made.

The error display window 170 can be closed by pointing the box labelled "Close" at the upper right position in the window through the entry device 152 or 153.

The background color in each room image region on the main window 160 and flickers of the outer frame 171 of the error display window 170 can be canceled, for example, by closing the error display window or by pressing the escape key on the keyboard 153. In this case, if a device that does not restore from an error still exists in a corresponding room, the background color of the image display region for the device in the main window 160 is changed from red flickers to, for example, red light. When errors occur in parallel in multiple rooms and some error display windows 160 are displayed, by closing the uppermost error display window, another window immediately under it appears on the top, and its outer frame 54 flashes with flickers.

Even in this period, error detection against video/audio devices in the underlying layer of the room manager is continued. That is, the room manager 86 publishes and circulates the error detection command to video/audio devices in the device layer in the master control room 83 in predetermined intervals.

Once a device restores from an error, a status command sent back from the device to the room manager 86 in response to the error detection command indicates its normal status with no error. The room manager 86 in receipt of the status command acknowledges that the device has restored from the error.

When the room manager 86 acknowledges the restoration of the device from the error, it requests the network server 87 in the system layer to delete the error information file written in the hard disc 88. Pursuant to the request, the network server 87 deletes the error information file.

After acknowledgement of restoration from the error, the above example deletes the error information file from the hard disc 88; however, the invention is not limited to this. For example, a flag indicating restoration from an error may be set up for the error information file without deleting the file. It is also possible to indicate restoration from an error by changing the file name of the error information file.

By maintaining the error information file and using it as an error history file, more efficient management of video/audio devices is expected. For example, since error history files are managed individually for respective video/audio devices, prior knowledge on the tendency of errors likely to occur in each device can be obtained by analyzing its error history file. In addition, through such analysis on all video/audio devices connected to the system, varieties in frequency of use between respective devices, for example, can be known and utilized for easier management of devices. The error history file has been explained above as containing error codes, error massages, dates and times of errors, and device information of the device that experienced errors; however, the contents of the error history file are not limited to these items. For example, information on the version of ROM installed in the device may be added to the error history file so that an operator can get the information on the ROM's version on the computer 1, which could not be known without opening the cover of the device in conventional systems. This makes it easier to cope with bugs or other problems in ROM.

The hard disc 88 is periodically checked by the supervisor 1 through the network server 87 as explained above. The supervisor 1 acknowledges through the check that the device in the device layer has restored from the error, and deletes the error information written in the memory/disc device 154 of the supervisor.

As explained above, when the error occurred, the region 161e representing the room of the device having the error was noticed by red flickers in the main window 160 on the display 155 of the supervisor 1. When all devices in the room regarded to have errors restore from the errors, the flickering light is automatically canceled, and the background color behind the device images are changed to white light indicating that no error exists in the devices. That is, if a room contains any device that does not restore from an error, red flickers of the room are not canceled.

In the error monitor/management system according to the embodiment, device identifying information is first acquired immediately after activation of the system. That is, each room manager issues a command to devices connected to its ports to request device identifying information. Device identifying information sent back from the devices in receipt of the command is delivered from the room manager to the network server 87, and written in the port management file 30 in form of a data base in the external storage device 88.

The external storage device 88 is checked by the computer 1 periodically, e.g. every some seconds. Through the check, the port management file 30 is read out, and device images or room images are displayed on the display 155 based on the device identifying information as explained above.

After that, each room manager settled in a respective room executes error detection against video/audio devices under its own control. When any error is detected in a respective device, a status command indicating occurrence of the error is sent back from the device, and dealt as an error information file. The error information file is written in the external storage device 88 through the network server 87. In parallel with the error detection, the room manager issue a request command to the devices in its management territory to request device monitoring information, and acquires device monitoring information such as device channel condition information and hour meter information, for example.

The acquired information files and a memo file input by a user through the computer 1 are managed as a data base in the external storage device 88. More specifically, device identifying information of each device is linked to file names of respective information files of the device in the data base management file 31. These information files are added to and stored with the history files made in the directory with the directory name indicating the device identifying information, i.e. the error history file, channel condition history file, hour meter history file and memo file, in this example.

The search of device information into the data base is performed from the computer 1 used as the supervisor. The process of the search is the same as that of the foregoing embodiment. It begins with designation of a device image in the main window on the display 155 of the computer 1 by a user through the entry device 152 or 1553. When the system includes a large number of devices and is configured to display images of respective units of management by room manager, for example, the user selects the image indicating the desired block to opens the window of the desired device images, and then selects a desired device image in the window.

After selecting the device image, the user designates an item to be searched. Then, the information file is read out at the data base management file 31 using the device identifying information of the port management file 30 as a pointer, and the file name of the target file and the directory name of the directory of the file are acquired. Based on the file name and the directory name, a desired file is read out from the information file group, and the results of the search is shown on the display 155 of the computer 1.

Figure 17:
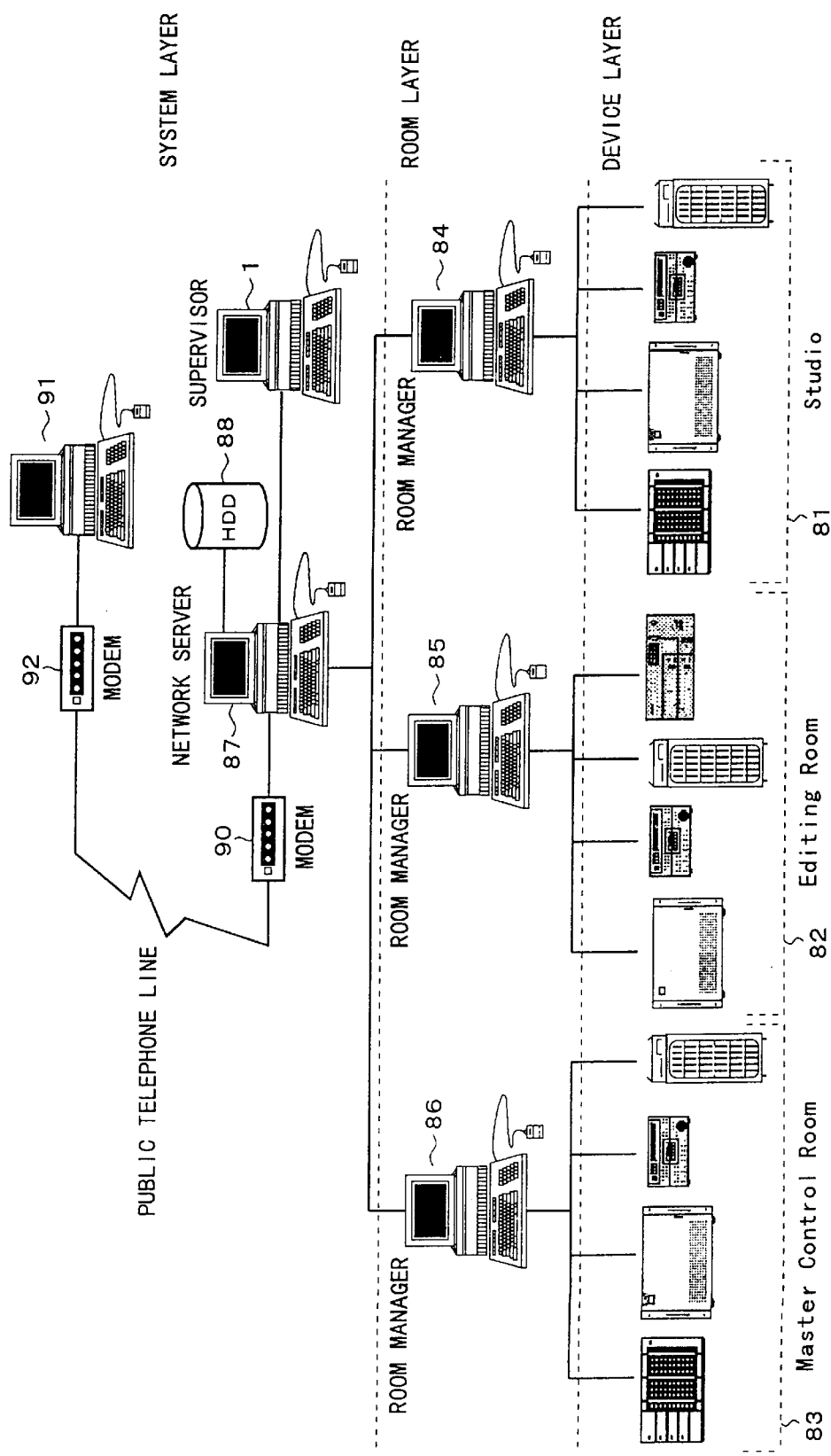
FIG. 17 is a diagram schematically showing a construction of an error monitor/management system taken as a modified version of the further embodiment.
Figure 18:
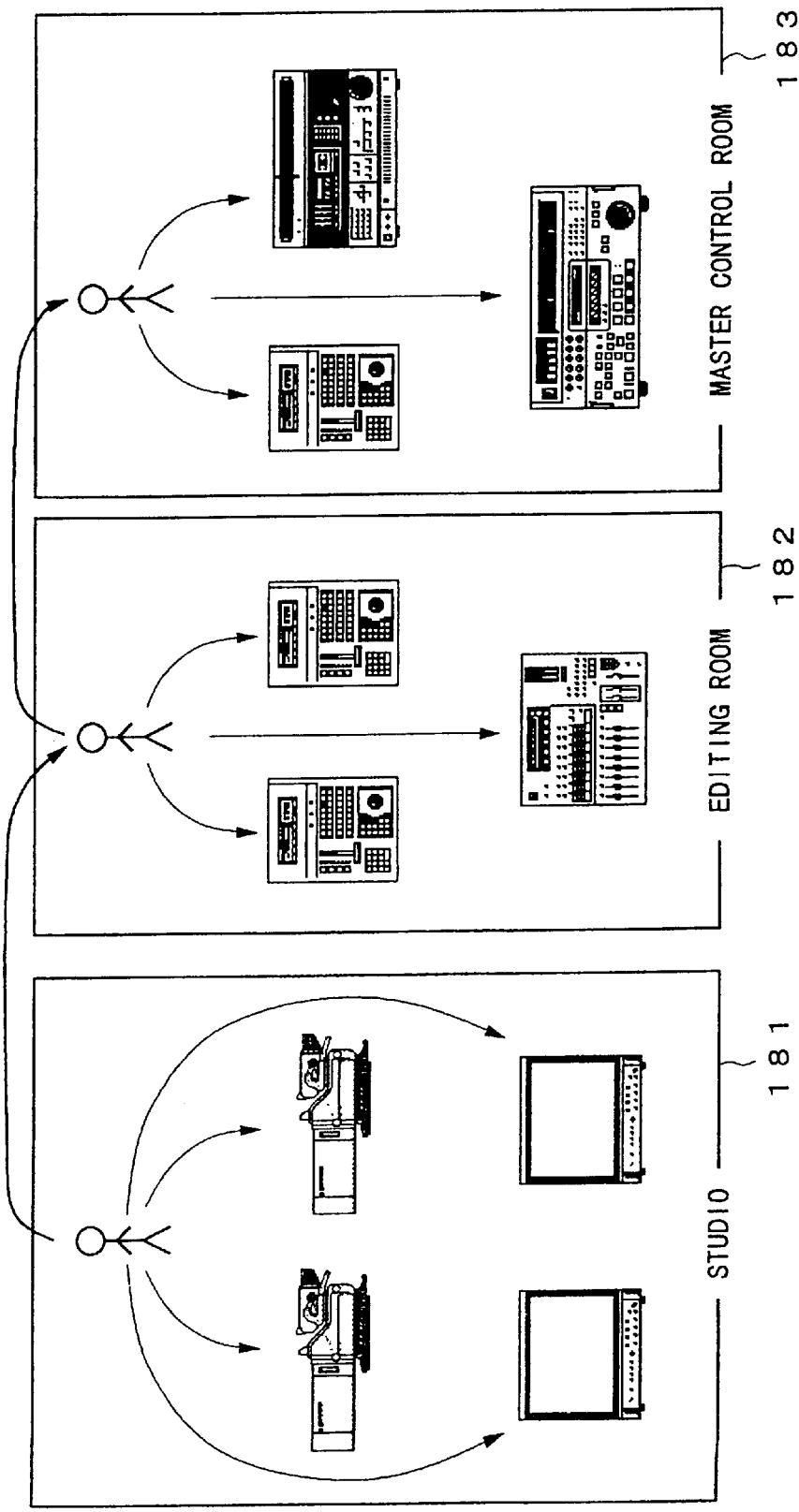
FIG. 18 is a diagram generalizing a conventional error monitoring process.

FIG. 17 shows a different version of this embodiment. This example additionally connects a modem 90 to the network server 87 in the construction of FIG. 13, and the system is connected to an external computer 91 also having connected a modem 90 via a public telephone line or other appropriate communication line. In this case, the external computer 91 can access to the data base established in the external storage device 88 of the system by communication from the external computer 91 to the network server 87 of the system through the model 92 and the public telephone line.

In this application, a user can conduct searches into the data base of the error monitor/management system even from a location apart from the site of the system. In this case, however, the system needs a security means such as call back processing or pass word check to protect the data base and the system.

The above explanation has been made as performing searches for information by first designating a target device and then designating an item to be searched, such as error history; however, the invention is not limited to this example. For example, designation of a search item may be made prior to designation of the target device. It is also possible to designate a search item alone such that information on all devices is displayed as a result of the search. It is further possible to permit simultaneous searches on a plurality of devices. In these cases, the system is preferably designed such that a user can create any command for a desired search in the window for designating search items and then instruct execution of the search command, thus to conduct various searches.

As described above, according to the present invention, all video/audio devices connected to the system are displayed in a main window of the display. Therefore, a user can observe all devices simultaneously to quickly cope with any trouble in the system.

The invention is also advantageous in that a great number of video/audio devices, as many as 1000 devices, can be put under error monitoring through a display of a single computer by employing a hierarchical construction of the system including a system layer, group layer and device layer.

Additionally, even when a number of video/audio devices set in different sites are connected to a single system, the system can be designed to display images indicating units of devices, which may be rooms each containing a plurality of devices. Therefore, integral error monitoring of all devices through a single computer is made possible.

Thus, in a broadcasting station, for example, all video/audio devices used in the station can be put under integral error monitoring by a single monitor, which contributes to reduction of the staff in charge of monitoring the video/audio devices.

Further, by providing a network server in the system layer for management of a LAN line, the system is made available for on-line connection from the exterior.

The system may also be designed to indicate the existence of any error in any device by changing the background color of an image indicating the device into a warning color and by simultaneously generating a warning sound so as to reliably inform an operator of the existence of the error through both vidual and audible senses.

Detailed comments shown on the display in linkage to an error message facilitate an operator to know the nature of the error without reference to a manual of the device.

By storing information on ever-experienced errors in form of error history files in the system, an operator can obtain a prior knowledge on tendencies of errors liable to occur in respective devices throughout the station through analysis of the files.

Since the system is configured to monitor all devices through a single computer, an operator need not move to separate sites of devices. This is especially advantageous in an application such as broadcasting station where a number of devices are set in different rooms.

It is another advantage of the invention that information on devices can be obtained from the data base by simply pointing a device image displayed on the computer through a mouse or other entry device, which permits an operator to work without the knowledge on the device identifying information of the device.

What is claimed is:

1. An error monitoring system for conducting error monitoring of a plurality of video/audio devices, comprising:
   processing means for executing an error monitoring process by detecting errors occurring in said video/audio devices;
   communication means connecting said video/audio devices to said processing means, said communication means comprising a plurality of communication ports, each of said video/audio devices being connected to said processing means via one of said communication ports; and
   display means connected to said processing means to simultaneously display on a common display plane a plurality of images indicating said video/audio devices and to give an error indication in accordance with a result of the error monitoring process by said processing means;
   said processing means automatically executing the error monitoring process against respective said video/audio devices by circularly issuing an error detection signal to said video/audio devices, each said video/audio device in receipt of said error detection signal sending back an error signal, including an error code, indicating the nature of an error that exists therein, and controlling said display means to give said error indication by emphasizing one of said images corresponding to one of said video/audio devices from which an error signal is detected by said processing means;
   wherein each said video/audio device is associated with at least one information file containing information concerning the error monitoring process and including at least historical information regarding prior errors for each said video/audio device so that the likelihood and frequency of types of errors are determined, thereby allowing for the efficient dealing with these errors, and a database management file for managing said information files, said database management file comprising information listing each of said plurality of communication ports, information regarding video/audio devices connected to respective ones of said plurality of communication ports, and said historical information associated with each of said video/audio devices and wherein for each said video/audio device said communication port is linked to said database management file by respective device identifying information and said database management file is linked to said information files by respective information file pointers.

2. The error monitoring system according to claim 1, wherein each said video/audio device has a self diagnostic function to find out any error therein, and wherein when any error occurs in any one of said video/audio devices, said processing means issues to said video/audio device containing the error a designation signal designating an error item, and said video/audio device in receipt of said designation signal sends back to said processing means an item signal indicating error information on said error item.

3. The error monitoring system according to claim 1, wherein said processing means is equipped with sound generating means, and controls it to generate a warning sound while making said display means to emphasize said image of the device containing the error when said error is detected in said video/audio device.

4. An error monitoring system for conducting integral error monitoring of a plurality of video/audio devices that are grouped into certain units, comprising:
   first information processing means that acquires error information for each said unit by detecting any error existing in said video/audio devices, said first information processing means automatically executing an error monitoring process by circularly issuing an error detection signal to said video/audio devices, each said video/audio device in receipt of said error detection signal sending back an error signal, including an error code, indicating the nature of an error that exists therein;
   communication means connecting said video/audio devices to said first information processing means, said communication means comprising a plurality of communication ports each of said video/audio devices being connected to said first information processing means via one of said communication ports;
   second information processing means connected to said first information processing means through a predetermined communication line to acquire said error information acquired by said first information processing means;
   third information processing means connected to said second information processing means through said predetermined communication line to acquire said error information acquired by said second information processing means; and
   display means connected to and controlled by said third information processing means to display images indicating said video/audio devices connected to said first information processing means and to give an error indication by emphasizing said image of particular one of said video/audio devices when said third information processing means detects an error in said particular video/audio device;
   wherein each said video/audio device is associated with at least one information file containing information concerning the error monitoring process and including at least historical information regarding prior errors for each said video/audio device so that the likelihood and frequency of types of errors are determined, thereby allowing for the efficient dealing with these errors, and a database management file for managing said information files, said database management file comprising information listing each of said plurality of communication ports, information regarding video/audio devices connected to respective ones of said plurality of communication ports, and said historical information associated with each of said video/audio devices and wherein for each said video/audio device said communication port is linked to said database management file by respective device identifying information and said database management file is linked to said information files by respective information file pointers.

5. The error monitoring system according to claim 4, wherein:
   said first information processing means circularly issues an error detection signal to said video/audio devices;
   each said video/audio device that receives said error detection signal and detects an error therein sends back to said first information processing means device status information that includes an identifying code for identifying said video/audio device and an error code indicating the type of the error;
   said first information processing means in receipt of said device status information issues to said video/audio device a request signal to request detailed information on said error detected in said video/audio device;

said video/audio device in receipt of said request signal issues said error information indicating the nature of said error; and said first information processing means acquires said error information by receiving said error information.

6. The error monitoring system according to claim 4, wherein said third information processing means detects said error in said video/audio device connected to said first information processing means when said error information acquired from said first information processing means is read out from said first information processing means in said second information processing means.

7. The error monitoring system according to claim 4, wherein each said video/audio device has a self diagnostic function to find out any error occurring therein, and wherein when any error occurs in any one of said video/audio devices, said first information processing means issues to said video/audio device containing the error a designation signal designating an error item, and said video/audio device in receipt of said designation signal sends back to said first information processing means an item signal indicating error information on said error item.

8. The error monitoring system according to claim 4, wherein said predetermined communication line is an Ethernet having TCP/IP as its communication protocol, and wherein said video/audio devices are connected to said communication means by a serial line having RS-232C as its communication protocol, and said communication means includes converter means for converting the communication protocol of a transferred signal from TCP/IP to RS-232C or vice versa.

9. The error monitoring system according to claim 4, wherein said third information processing means is equipped with sound generating means, and controls it to generate a warning sound while making said display means to emphasize said image of the device containing the error when said error is detected in said video/audio device.

10. The error monitoring system according to claim 4, wherein said display means is controlled by said third information processing means to emphasize said image corresponding to said video/audio device containing the error and to display said error information on said video/audio device acquired by said third information processing means when said error is detected in said video/audio device by said third information processing means, such that said error information on said video/audio device is displayed together with said emphasized image of the video/audio device.

11. The error monitoring system according to claim 10, wherein said error information displayed by said display means is displayed on a common display plane with said emphasized image of the video/audio device.

12. The error monitoring system according to claim 10, wherein said error information displayed by said display means is emphasized in synchronism with said emphasized image of the video/audio device.

13. The error monitoring system according to claim 4, wherein said error information includes the day and time of occurrence of said error, a device ID of said video/audio device in which the error occurred, an error code, and an error message.

14. The error monitoring system according to claim 4, wherein said video/audio devices are allotted to different rooms, and wherein said images displayed by said display means are hierarchically displayed by images of rooms and then by images of video/audio devices belonging to each said room.

15. The error monitoring system according to claim 4, wherein said video/audio devices are allotted to units management by a plurality of said first information processing means, and wherein said images displayed by said display means are hierarchically displayed by images of said units of management and then by images of video/audio devices belonging to each said unit of management.

16. The error monitoring system according to claim 4, wherein said second information processing means includes second communication means for communicating with external information processing means connected to said predetermined communication line, said external information processing means being able to do jobs of said second information processing means.

17. An error monitoring system for conducting integral error monitoring of a plurality of video/audio devices, comprising:

information processing means that acquires error information for each of said devices by detecting any error existing in said video/audio devices by circularly issuing an error detection signal to said video/audio devices, each said video/audio device in receipt of said error detection signal sending back an error signal, including an error code, indicating the nature of an error that exists therein, and acquires device identifying information identifying respective said video/audio devices and device monitor information of said video/audio devices;

communication means connecting said video/audio devices to said information processing means, said communication means comprising a plurality of communication ports, each of said video/audio devices being connected to said processing means via one of said communication ports; and storage means connected to said information processing means to store said device identifying information and said device monitor information so as to permit said device monitor information to be obtained by means of said device identifying information;

said information processing means automatically storing said device identifying information and said device monitor information in said storage means, automatically managing said device monitor information based on said device identifying information, automatically searching into said storage means to find out said device identifying information on one of said video/audio devices based on new one of said device monitor information when the new device monitor information is obtained, and adding said new device monitor information to said device monitor information searched out;

wherein each said video/audio device is associated with at least one information file containing information concerning the error monitoring process and including at least historical information regarding prior errors for each said video/audio device so that the likelihood and frequency of types of errors are determined, thereby allowing for the efficient dealing with these errors, and a database management file for managing said information files, said database management file comprising information listing each of said plurality of communication ports, information regarding video/audio devices connected to respective ones of said plurality of communication ports, and said historical information associated with each of said video/audio devices and wherein for each said video/audio device said communication port is linked to said database management file by respective device identifying information and said database management file is linked to said information files by respective information file pointers.

18. The error communication system according to claim 17, further comprising display means connected to and controlled by said processing means to display images of said video/audio devices connected to said processing means and to give an error indication by emphasizing said image of particular one of said video/audio devices when said processing means detects an error in said particular video/audio device.

19. The error monitoring system according to claim 18, wherein said display means is controlled by said information processing means to emphasize said image corresponding to said video/audio device containing the error and to display said error information on said video/audio device acquired by said information processing means when said error is detected in said video/audio device by said information processing means, such that said error information on said video/audio device is displayed together with said emphasized image of the video/audio device.

20. The error monitoring system according to claim 19, wherein said error information displayed by said display means is displayed on a common display plane with said emphasized image of the video/audio device.

21. The error monitoring system according to claim 20, wherein said error information displayed by said display means is emphasized in synchronism with said emphasized image of the video/audio device.

22. The error monitoring system according to claim 18, further comprising entry means connected to said information processing means and used to designate any one of images of said video/audio devices displayed on said display means and to input information therethrough so that said device monitor information can be searched out by way of said device identifying information of any desired one of said video/audio devices stored in said storage means by designating said desired video/audio device through said entry means.

23. The error monitoring system according to claim 17, wherein each said video/audio device has a self diagnostic function to find out any error therein, and wherein when any error occurs in any one of said video/audio devices, said processing means issues to said video/audio device containing the error a designation signal designating an error item, and said video/audio device in receipt of said designation signal sends back to said information processing means an item signal indicating error information on said error item.

24. The error monitoring system according to claim 17, wherein said information processing means is equipped with sound generating means, and controls it to generate a warning sound while making said display means to emphasize said image of the device containing the error when said error is detected in said video/audio device.

25. The error monitoring system according to claim 17, wherein said device monitor information includes error information indicating the nature of said error in the video/audio device acquired by said information processing means.

26. An error monitoring system for conducting integral error monitoring of a plurality of video/audio devices that are grouped into certain units, comprising:
first information processing means that acquires error information for each said unit by detecting any error existing in said video/audio devices by circularly issuing an error detection signal to said video/audio devices, each said video/audio device in receipt of said error detection signal sending back an error signal, including an error code, indicating the nature of an error that exists therein, and acquires device identifying information identifying respective said video/audio devices and device monitor information of said video/audio devices;

communication means connecting said video/audio devices to said first information processing means, said communication means comprising a plurality of communication ports, each of said video/audio devices being connected to said first information processing means via one of said communication ports; and second information processing means connected to said first information processing means through a predetermined communication line to acquire said error information, said device identifying information and said device monitor information that are acquired by said first information processing means;

third information processing means connected to said second information processing means through said predetermined communication line to acquire said error information acquired by said second information processing means; and storage means connected to said second information processing means to store said device identifying information and said device monitor information so as to permit said device monitor information and said error information to be identified by said device identifying information;

said second information processing means automatically storing said error information, said device identifying information and said device monitor information in said storage means, automatically managing said error information and said device monitor information based on said device identifying information, automatically searching into said storage means to find out said device identifying information and/or said error information linked to new device monitor information and/or new error information when the new device monitor information and/or error information is obtained, and adding said new device monitor information and/or error information to said device monitor information searched out;

wherein each said video/audio device is associated with at least one information file containing information concerning the error monitoring process and including at least historical information regarding prior errors for each said video/audio device so that the likelihood and frequency of types of errors are determined, thereby allowing for the efficient dealing with these errors, and a database management file for managing said information files, said database management file comprising information listing each of said plurality of communication ports, information regarding video/audio devices connected to respective ones of said plurality of communication ports, and said historical information associated with each of said video/audio devices and wherein for each said video/audio device said communication port is linked to said database management file by respective device identifying information and said database management file is linked to said information files by respective information file pointers.

27. The error monitoring system according to claim 26, further comprising display means connected to and controlled by said third information processing means to display images of said video/audio devices connected to said first information processing means and to give an error indication by emphasizing said image of particular one of said video/audio devices when said third information processing means acquired said error information of said particular video/audio device.

28. The error monitoring system according to claim 27, wherein said display means is controlled by said third information processing means to emphasize said image corresponding to said video/audio device containing the error and to display said error information on said video/audio device acquired by said third information processing means when said error information is detected in said video/audio device by said third information processing means, such that said error information on said video/audio device is displayed together with said emphasized image of the video/audio device.

29. The error monitoring system according to claim 28, wherein said error information displayed by said display means is displayed on a common display plane with said emphasized image of the video/audio device.

30. The error monitoring system according to claim 29, wherein said error information displayed by said display means is emphasized in synchronism with said emphasized image of the video/audio device.

31. The error monitoring system according to claim 26, wherein:

said first information processing means circularly issues an error detection signal to said video/audio devices;

each said video/audio device that receives said error detection signal and detects an error therein sends back to said first information processing means device status information that includes an identifying code for identifying said video/audio device and an error code indicating the type of the error;

said first information processing means in receipt of said device status information issues to said video/audio device a request signal to request detailed information on said error detected in said video/audio device;

said video/audio device in receipt of said request signal sends back said error information indicating the nature of said error; and said first information processing means acquires said error information by receiving said error information.

32. The error monitoring system according to claim 26, wherein each said video/audio device has a self diagnostic function to find out any error occurring therein, and wherein when any error occurs in any one of said video/audio devices, said first information processing means issues to said video/audio device containing the error a designation signal designating an error item, and said video/audio device in receipt of said designation signal sends back to said first information processing means an item signal indicating error information on said error item to permit said first information processing means to acquire said error information.

33. The error monitoring system according to claim 26, wherein said third information processing means issues a check signal to said second information processing means to confirm whether said error information has been stored in said storage means, and wherein if said error information is already stored in said storage means, said third information processing means acquires said error information by reading it from said storage means through said second information processing means.

34. The error monitoring system according to claim 26, wherein said error information includes the day and time of occurrence of said error, a device ID of said video/audio device in which the error occurred, an error code indicating the type of the error, and an error message.

35. The error monitoring system according to claim 26, wherein said predetermined communication line is an Ethernet having TCP/IP as its communication protocol, and wherein said video/audio devices are connected to said communication means by a serial line having RS-232C as its communication protocol, and said communication means includes converter means for converting the communication protocol of a transferred signal from TCP/IP to RS-232C or vice versa.

36. The error monitoring system according to claim 26, wherein said third information processing means is equipped with sound generating means, and controls it to generate a warning sound while making said display means to emphasize said image of the device containing the error when said error is detected in said video/audio device.

37. The error monitoring system according to claim 26, further comprising memo information entry means connected to said third information processing means and used by a user to input desired memo information therethrough to any desired one of said video/audio devices, and wherein said memo information introduced through said memo information entry means is stored in said storage means together with said device monitor information, said device identifying information and said error information.

38. An error monitoring method for monitoring errors of a plurality of video/audio devices, comprising:

a first step in which information processing means connected to said video/audio devices judges whether any error exists in any one of said video/audio devices by circularly issuing an error detection signal to said video/audio devices, each said video/audio device in receipt of said error detection signal sending back an error signal, including an error code, indicating the nature of an error that exists therein;

a second step in which; when any error is judged to exist in said first step, display means displaying images corresponding to respective said video/audio devices emphasizes one of said images corresponding to one of said video/devices in which said error exists;

a third step in which said information processing means acquires error information indicating said error from said video/audio device containing the error;

a fourth step in which said information processing means controls said display means to display said error information acquired in said third step;

a fifth step in which said error information displayed by said display means in said fourth step is stored in storage means connected to said information processing means; and a sixth step in which when said information processing means judges that no error exists in any one of said video/audio devices connected thereto and if there is any one of said images of said video/audio devices that is still emphasized, then said information processing means returns said emphasized image into its original state, and then goes back to said first step;

wherein each of said video/audio devices is connected to said processing means via one of a plurality of communication ports comprising communication means; and wherein each said video/audio device is associated with at least one information file containing information concerning the error monitoring process and including at least historical information regarding prior errors for each said video/audio device so that the likelihood and frequency of types of errors are determined, thereby allowing for the efficient dealing with these errors, and a database management file for managing said information files, said database management file comprising information listing each of said plurality of communication ports, information regarding video/audio devices connected to respective ones of said plurality of communication ports, and said historical information associated with each of said video/audio devices and wherein for each said video/audio device said communication port is linked to said database management file by respective device identifying information and said database management file is linked to said information files by respective information file pointers.

39. The error monitoring method according to claim 38, wherein said first step includes:

each said video/audio device having a self diagnostic function;

said information processing means issuing a designation signal designating an error item to any one of said video/audio devices in which said error exists; and said video/audio device in receipt of said designation signal supplying an item signal indicating error information corresponding to said error item.

40. The error monitoring system according to claim 38, wherein said second step includes:

generating a warning sound from sound generating means connected to said processing means simultaneously at the same time when said image of the video/audio device containing the error is emphasized on said display means.

41. The error monitoring system according to claim 38, further comprising a sixth step in which, when a closing signal for closing said error information displayed on said display means in said fourth step after said error information is stored in said storage means in said first step, said error information on said display means is closed, and said emphasized image of the video/audio device that contained the error is changed to another emphasized image.

42. The error monitoring method according to claim 38, wherein said first step includes:

a device identifying information acquiring step in which said information processing means issues to said video/audio devices connected thereto a device identifying information request signal to request device identifying information for identifying respective said video/audio devices; said video/audio devices in receipt of said device identifying information request signal send back said device identifying information to said information processing means; and said information processing means acquires said device identifying information; and a step for storing said device identifying information acquired in said device identifying information acquiring step in storage means connected to said information processing means.

43. An error monitoring method for monitoring errors of a plurality of video/audio devices, comprising:

a first step in which information processing means connected to said video/audio devices issues to said video/audio devices connected thereto a device identifying information request signal to request device identifying information for identifying respective said video/audio devices; said video/audio devices in receipt of said device identifying information request signal send back said device identifying information to said information processing means; and said information processing means acquires said device identifying information;

a second step for storing said device identifying information acquired in said first step in storage means connected to said information processing means;

a third step for judging whether any error exists in any of said video/audio devices by circularly issuing an error detection signal to said video/audio devices, each said video/audio device in receipt of said error detection signal sending back an error signal, including an error code, indicating the nature of an error that exists therein;

a fourth step in which, when any error is judged to exist in said third step, said information processing means acquires error information indicating the nature of the error from said video/audio device containing the error, and said error information is stored in said storage means to permit said error information to be obtained through said device identifying information;

a fifth step for issuing a monitor information request signal to request device monitor information containing information necessary for monitoring said video/audio devices from said information processing means to said video/audio devices; sending back said device monitor information responsive to said monitor information request signal form said video/audio devices to said information processing means; said device monitoring information being acquired by said information processing means;

a sixth step for storing said device monitor information acquired in said fifth step in said storage means so as to permit said device monitor information to be obtained through said device identifying information; and a seventh step for automatically searching out said device identifying information stored in said storage means corresponding to new device monitor information and/or error information when said new device monitor information and/or error is obtained in said first step; and for adding said new device monitor information and/or error information to said device monitor information and/or error information searched out;

wherein each of said video/audio devices is connected to said processing means via one of a plurality of communication ports comprising communication means; and wherein each said video/audio device is associated with at least one information file containing information concerning the error monitoring process and including at least historical information regarding prior errors for each said video/audio device so that the likelihood and frequency of types of errors are determined, thereby allowing for the efficient dealing with these errors, and a database management file for managing said information files, said database management file comprising information listing each of said plurality of communication ports, information regarding video/audio devices connected to respective ones of said plurality of communication ports, and said historical information associated with each of said video/audio devices and wherein for each said video/audio device said communication port is linked to said database management file by respective device identifying information and said database management file is linked to said information files by respective information file pointers.

44. The error monitoring method according to claim 43, further comprising the step of:

displaying images indicating said video/audio devices connected to said information processing means on display means connected to said information processing means; and and emphasizing one of said images indicating one of said video devices containing an error on said display means under control of said information processing means when said error is detected in said video/audio device by said information processing means.

45. The error monitoring method according to claim 44, wherein said display means is controlled by said information processing means to emphasize one or more of images of said video audio devices and to display error information of each said video/audio device acquired by said information processing means such that, in addition to the emphasized image of the video/audio device, said error information corresponding to said video/audio device is displayed.

46. The error monitoring method according to claim 44, wherein said error information displayed on said display means is displayed on a common display plane with the emphasized image of said video/audio device.

47. The error monitoring method according to claim 44, wherein said error information displayed on said display means is emphasized in synchronism with the emphasized image of said video/audio device.

48. The error monitoring method according to claim 43, wherein each said video/audio device has a self diagnostic function; said information processing means issues a designation signal designating an error item to said video/audio device in which said error exists; and said video/audio device in receipt of said designation signal sends back an item signal indicating error information corresponding to said error item.

49. The error monitoring method according to claim 43, wherein sound generating means is connected to said processing means to generate a warning sound concurrently with the emphasis of said image of said video/audio device when said information processing means detects said error in said video/audio device.

* * * * *